United States Patent
Carter

(10) Patent No.: US 11,934,293 B2
(45) Date of Patent: Mar. 19, 2024

(54) DYNAMICALLY LINKING SOCIAL MEDIA REACTIONS TO ACTIONS PERFORMED BY REMOTE APPLICATIONS

(71) Applicant: Google LLC, Mountain View, CA (US)

(72) Inventor: Bernadette Alexia Carter, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/256,923

(22) PCT Filed: Jul. 20, 2018

(86) PCT No.: PCT/US2018/042982
§ 371 (c)(1),
(2) Date: Dec. 29, 2020

(87) PCT Pub. No.: WO2020/018109
PCT Pub. Date: Jan. 23, 2020

(65) Prior Publication Data
US 2021/0286705 A1 Sep. 16, 2021

(51) Int. Cl.
*G06F 9/44* (2018.01)
*G06F 3/04842* (2022.01)
*G06F 11/36* (2006.01)
*H04L 51/52* (2022.01)

(52) U.S. Cl.
CPC ...... *G06F 11/3612* (2013.01); *G06F 3/04842* (2013.01); *H04L 51/52* (2022.05)

(58) Field of Classification Search
USPC ............................................... 717/102–115
See application file for complete search history.

(56) References Cited

U.S. PATENT DOCUMENTS

| | | | |
|---|---|---|---|
| 9,460,163 B1 | 10/2016 | Toal et al. | |
| 2012/0136959 A1 | 5/2012 | Anand et al. | |
| 2013/0304828 A1* | 11/2013 | Robertson ........... | G06F 16/7867 709/204 |
| 2014/0156341 A1 | 6/2014 | Ryszard et al. | |
| 2014/0180788 A1* | 6/2014 | George ................. | G06Q 50/01 705/14.72 |

(Continued)

OTHER PUBLICATIONS

Atlassian: Jira Software, Feature for software development, Feb. 1, 2018, XP055497322, Retrieved from the Internet: https://web.archive.orgjweb/2018020103658/https:jjwww.atlassian.com/software/jiraj features, 11 pp.

(Continued)

*Primary Examiner* — Chuck O Kendall
(74) *Attorney, Agent, or Firm* — Shumaker & Sieffert, P.A.

(57) ABSTRACT

A method includes associating, by a computing system configured to provide a social media service, based on content of a post to the social media service, social media reactions for the content of the post with an action to be performed by an application. The method includes determining, by the computing system, a social media reaction to the content of the post. The method further includes publishing, by the computing system, an indication of the social media reaction to the social media service, and outputting, by the computing system and to a remote system that is executing the application, a command for the application to perform the action associated with the social media reactions.

20 Claims, 7 Drawing Sheets

(56) References Cited

U.S. PATENT DOCUMENTS

2016/0105383 A1     4/2016   Seymour et al.
2017/0250931 A1     8/2017   Andrew et al.

OTHER PUBLICATIONS

International Search Report and Written Opinion from International Application No. PCT/US2018/042982, dated Nov. 19, 2019, 16 pp.
International Preliminary Report on Patentability from International Application No. PCT/US2018/042982, dated Feb. 4, 2021, 9 pp.

* cited by examiner

DYNAMICALLY LINKING SOCIAL MEDIA REACTIONS TO ACTIONS PERFORMED BY REMOTE APPLICATIONS

BACKGROUND

Some social media platforms allow users to connect with other social media users, e.g., to share thoughts about a common topic, issue, or idea, for example, by posting content and/or reactions to posted content. As such, a social media platform may contain data that indicates many different user views and preferences regarding certain topics, issues, or ideas. An analysis system (e.g., as part of a social media platform or a third-party system unrelated to a social media service) may parse content and reactions posted to social media platforms to determine whether to take certain actions, based on the content and reactions, relative to a common topic, issue, or idea. In such instances, an analysis system may monitor social media posts and reactions to determine whether any posts or reactions will aid in the system's analysis of a particular issue, such as analyzing product reviews posted to an online store to determine whether a product is defective. Sometimes however, relevant posts or reactions may be missed by an analysis system, potentially leading to less accurate analysis or taking incorrect actions as a result.

SUMMARY

The disclosed subject matter relates to techniques for dynamically linking social media reactions to actions performed by remote applications. A social media platform that provides a social media service may allow users of the social media platform to post content to the social media service, as well as comment on and express a reaction to content posted by other users. The social media platform associates reactions expressed by users of the social media platform with actions performed by the social media platform itself, or actions performed by remote applications that execute outside of and separate from the social media platform itself. For example, a remote application may be a software bug tracking application, and the social media platform may associate reactions to content of a post with actions performed by the software bug tracking application. In such a scenario, the social media platform may publish content created by a user of the social media platform indicating the user has experienced a particular bug in a particular application installed at the user's device. The social media platform may associate a reaction, such as an expression of approval (e.g., "I agree with this") to the post about the bug with an action to be taken by the bug tracking application (e.g., to increase priority of that bug in the bug tracking application), thereby automatically giving the bug tracking application visibility into relevant content and reactions posted to the social media platform.

By dynamically associating reactions to social media content with actions performed by another application separate from a social media platform, the social media platform may enable a user of the social media platform to more efficiently perform actions associated with the social media content. For instance, the social media platform may automatically command the application to perform the action in response to receiving an indication of a reaction to social media content, which may reduce the number of user inputs, enable quicker operations, increase performance of the user computing device, and decrease the amount of power consumed by the user computing device relative to other computing devices that require more user inputs to command a remote computing device to perform some action.

Further to the descriptions below, a user may be provided with controls allowing the user to make an election as to both if and when computing devices, or computing systems described herein can collect or make use of personal data, and if and when the user is sent content or communications from a server. In addition, certain data may be treated in one or more ways before it is stored or used, so that personally identifiable data is removed. For example, a user's identity may be treated so that no personally identifiable data can be determined for the user, or a user's geographic location may be generalized where location data is obtained (such as to a city, ZIP code, or state level), so that a particular location of a user cannot be determined. Thus, the user may have control over what data is collected about the user, how that data is used, and what data is provided to the user.

In one example, the disclosure is directed to a method that includes associating, by a computing system configured to provide a social media service, based on content of a post to the social media service, social media reactions for the content of the post with an action to be performed by an application. The method also includes determining, by the computing system, a social media reaction to the content of the post. The method further includes, responsive to determining the social media reaction: publishing, by the computing system, an indication of the social media reaction to the social media service; and outputting, by the computing system and to a remote system that is executing the application, a command for the application to perform the action associated with the social media reactions.

In another example, the disclosure is directed to a computing device that includes memory and at least one processor. The memory includes instructions that when executed, cause the at least one processor to associate, based on content of a post to the social media service, social media reactions for the content of the post with an action to be performed by an application. Execution of the instructions also cause the at least one processor to determine a social media reaction to the content of the post. Execution of the instructions also cause the at least one processor to, responsive to determining the social media reaction: publish an indication of the social media reaction to the social media service, and output, to a remote system that is executing the application, a command for the application to perform the action associated with the social media reactions.

In another example, the disclosure is directed to a computer-readable storage medium comprising instructions that, when executed cause at least one processor to associate, based on content of a particular post to a social media service, social media reactions for the content of the post with an action to be performed by a bug tracking application, wherein the content of the post is associated with a particular bug for another application. Execution of the instructions also cause the at least one processor to receive, from a computing device, an indication of user input selecting a graphical element indicating a user affirmation or a user disapproval of the content of the post. Execution of the instructions further cause the at least one processor to, responsive to receiving the indication of user input selecting the graphical element: output, to the computing device and for display, an indication of the affirmation of the content of the post; and output, to a remote system that is executing the bug tracking application, a command for the bug tracking application to change priority of the particular bug.

The details of one or more examples are set forth in the accompanying drawings and the description below. Other features, objects, and advantages of the disclosure will be apparent from the description and drawings, and from the claims.

DETAILED DESCRIPTION

Figure 1:
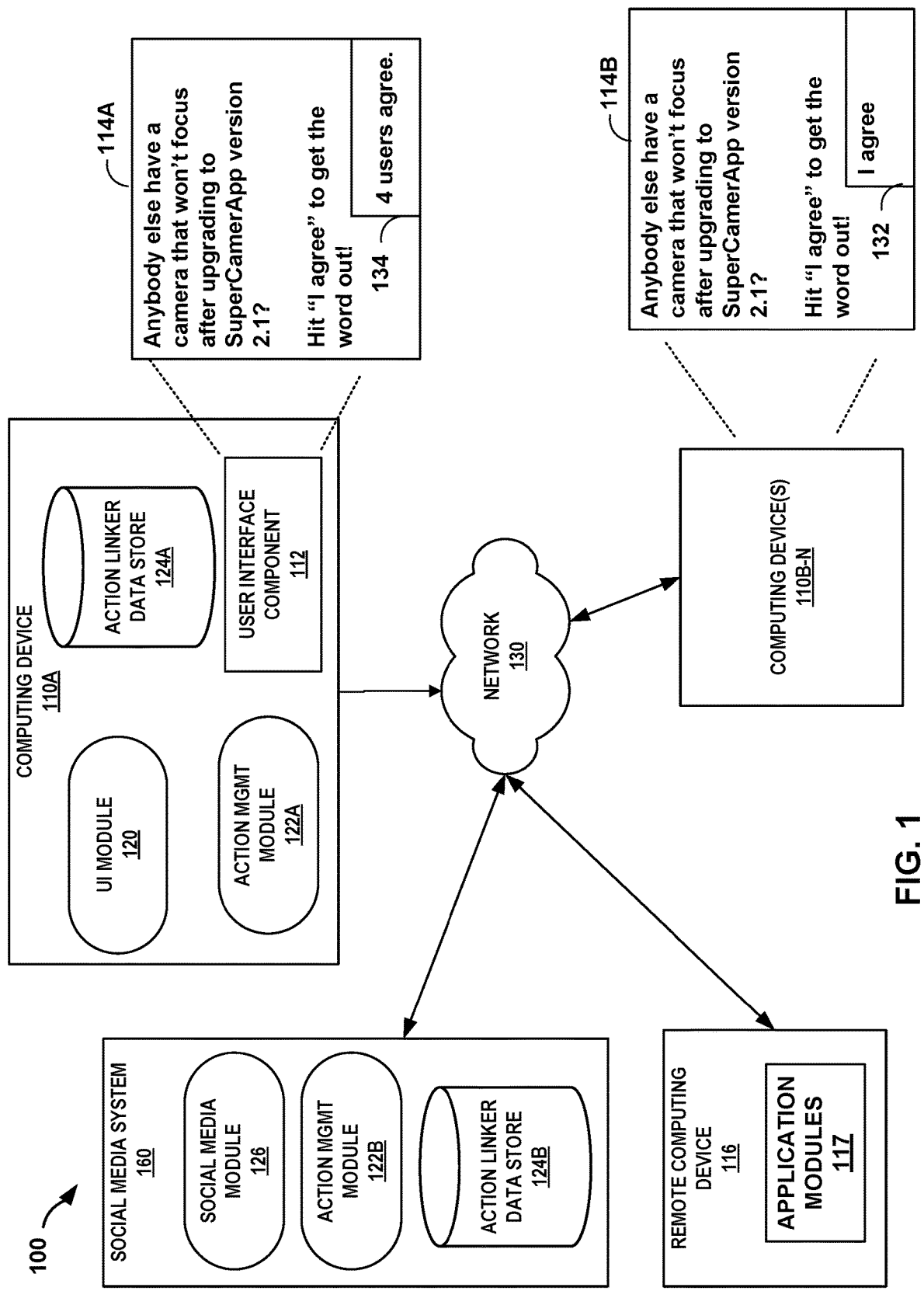
FIG. 1 is a conceptual diagram illustrating an example system that dynamically links social media reactions to actions to be performed by an application that executes outside a social media platform, in accordance with one or more aspects of the present disclosure.

FIG. 1 is a conceptual diagram illustrating an example system that dynamically links social media reactions to actions to be performed by an application executing outside of a social media platform, in accordance with one or more aspects of the present disclosure. System 100 of FIG. 1 includes social media system 160 in communication, via network 130, with computing devices 110A-110N (collectively, "computing devices 110") and remote computing device 116. Although system 100 is shown as being distributed amongst social media system 160, and computing devices 110, 116, in other examples, the features and techniques attributed to system 100 may be performed locally, by internal components of any combination of computing devices 110, 116, and 160.

Network 130 represents any public or private communications network, for instance, cellular, Wi-Fi®, and/or other types of networks, for transmitting data between computing systems, servers, and computing devices. Social media system 160 provides a social media platform and may exchange data, via network 130, with computing devices 110, 116 to provide a social media service that provides access to the social media platform when computing devices 110, 116 are connected to network 130.

Network 130 may include one or more network hubs, network switches, network routers, or any other network equipment, that are operatively inter-coupled thereby providing for the exchange of data between social media system 160 and computing devices 110, 116. Computing devices 110, 116, and social media system 160 may transmit and receive data across network 130 using any suitable communication techniques. Computing devices 110, 116, and social media system 160 may each be operatively coupled to network 130 using respective network links. The links coupling computing devices 110, 116, and social media system 160 to network 130 may be Ethernet or other types of network connections and such connections may be wireless and/or wired connections.

Computing devices 110 represent individual mobile or non-mobile computing devices that are associated with a particular user or user profile, and are configured to access the social media system 160 via network 130 and remote computing device 116 represents any type of computing device configured to execute one or more applications, examples of which are listed below. Examples of computing devices 110, 116 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device. Other examples of computing devices 110, 116 may exist beyond those listed above.

Remote computing device 116 includes one or more application modules 117A-117N. Examples of application modules 117 include a software bug tracking application, a calendar application, a messaging application, an office productivity suite of applications, a travel application (e.g., planning, reservation, ticketing, etc.), a survey and response application, or any other application.

Remote computing device 116 may exchange data with computing devices 110 via network 130. For example, remote computing device 116 may send data to computing devices 110 and may receive data from computing devices 110.

Remote computing device 116 may output a group of one or more actions that one of application modules 117 is configured to perform. For instance, in examples where application module 117A includes a bug tracking application, bug tracking application module 117A may be configured to add bugs to a database, add or update a bug description, change a priority level or ranking associated with a bug, or the like. In such examples, remote computing device 116 may output (e.g., to social media system 160 and/or one or more of computing devices 110) data identifying one or more bugs, data about the bugs, data indicative of a group of actions bug tracking application 117A is configured to perform, and the like.

Computing device 110A includes user interface component (UIC) 112, user interface (UI) module 120, action management module 122A, and action linker data store 124A. Although not shown, computing devices 110B-110N and/or computing devices 116 may include similar components and/or modules as computing device 110A.

In some instances, each of computing devices 110 is associated with a respective user or user profile. In some examples, a particular user or user profile may be associated with multiple computing devices 110.

Modules 120 and 122A may perform operations described using hardware, hardware and software, hardware and firmware, or a mixture of hardware, software, and firmware residing in and/or executing at one of computing device 110A. Computing device 110A may execute modules 120 and 122A with multiple processors or multiple devices. Computing device 110A may execute modules 120 and 122A as virtual machines executing on underlying hardware.

Modules 120 and 122A may execute as one or more services of an operating system or computing platform. Modules 120 and 122A may execute as one or more executable programs at an application layer of an operating system or computing platform.

UIC 112 of computing devices 110 may function as an input and/or output device for computing device 110A. UIC 112 may be implemented using various technologies. For instance, UIC 112 may function as an input device using presence-sensitive input screens, microphone technologies, infrared sensor technologies, cameras, or other input device technology for use in receiving user input. UIC 112 may function as output device configured to present output to a user using any one or more display devices, speaker technologies, haptic feedback technologies, or other output device technology for use in outputting data to a user.

UI module 120 may manage user interactions with UIC 112 and other components of computing device 110A. UI module 120 may cause UIC 112 to output a user interface as a user of computing device 110A views output and/or provides input at UIC 112. For example, as shown in FIG. 1, UI module 120 may send instructions to UIC 112 that cause UIC 112 to display user interface 114A at a display device of UIC 112. Similarly, a particular computing device of computing devices 110B-110N (e.g., computing device 110B) may display user interface 114B. User interfaces 114A and 114B are collectively referred to as "user interfaces 114."

User interfaces 114 are associated with a social media platform provided by social media system 160. In the example of FIG. 1, user interfaces 114 are primarily graphical user interfaces (GUIs), however, user interfaces 114 may in some examples be primarily audible, haptic, or a combination of graphical, audible, or haptic type user interfaces. In other words, user interfaces 114 may include data in various forms such as audible sounds, voice notifications, vibrations, etc.

UI module 120 and UIC 112 may receive one or more indications of input (e.g., voice input, touch input, non-touch or presence-sensitive input, video input, audio input, etc.) from a user as the user interacts with a user interface of user interfaces 114. In some examples, the input may be indicative of a social media reaction. UI module 120 and UIC 112 may interpret inputs detected at UIC 112 and may relay data about the inputs detected at UIC 112 to action management modules 122 and/or one or more other associated platforms, operating systems, applications, and/or services executing at computing device 110A or social media system 160, for example, to cause computing device 110A, social media system 160, or remote computing device 116 to perform one or more actions.

UI module 120 may receive data and instructions from one or more associated platforms, operating systems, applications, and/or services executing at computing device 110A and/or one or more remote computing systems, such as social media system 160. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A. For example, UI module 120 may cause UIC 112 to output user interfaces 114 based on data UI module 120 receives via network 130 from social media system 160. UI module 120 may receive, as input from social media system 160 and/or action management module 122A, data (e.g., audio data, text data, image data, etc.) and instructions for presenting as user interfaces 114.

Social media system 160 represents any type of computing device that is configured to provide access, via a social media service (e.g., social media module 126), to a social media platform maintained by the social media system. Examples of social media system 160 include cloud computing environments, servers, desktop computers, laptop computers, mobile phones, tablet computers, wearable computing devices, countertop computing devices, home automation computing devices, televisions, stereos, automobiles, or any other type of computing device that is configured to provide access to a social media platform maintained by the social media system. In the example of FIG. 1, social media system 160 includes social media module 126, action management module 122B, and action linker data store 124B.

Modules 122B and 126 may perform operations described using hardware, hardware and software, hardware and firmware, or a mixture of hardware, software, and firmware residing in and/or executing at social media system 160. Social media system 160 may execute modules 122B and 126 with multiple processors or multiple devices. Social media system 160 may execute modules 122B and 126 as virtual machines executing on underlying hardware. Modules 122B and 126 may execute as one or more services of an operating system or computing platform. Modules 122B and 126 may execute as one or more executable programs at an application layer of an operating system or computing platform.

Action management module 122A and action management module 122B (collectively, "action management modules 122") may collaboratively maintain action linker data stores 124A and 124B as part of a service accessed via computing devices 110. Action management module 122B and action linker data store 124B represent server-side or cloud implementations of an example service whereas action management module 122A and action linker data store 124A represent a client-side or local implementation of the example service. In some examples, some or all the functionality attributed to action management module 122A may be performed by action management module 122B, and vice versa.

In accordance with techniques of this disclosure, action management modules 122 may be configured to dynamically link one or more social media reactions to various actions performed by a particular application module (e.g., bug tracking application module 117A). In the example of FIG. 1, action management modules 122 receives an indication of content included in a post to a social media service. For example, a user of computing device 110A may interact with social media system 160 to post content to social media system 160. As used in this disclosure, content may refer to human readable data or human understandable data, such as text, images, videos, etc. UIC 112 may detect user input interacting with social media system 160. For example, UIC 112 may output, for display, a graphical user interface 114A associated with social media system 160, such as "home" page for a social media account associated with a user of computing device 110A. UIC 112 may detect user input creating content to be posted to the social media platform via a graphical user interface 114A or an audio interface. In the example of FIG. 1, UIC 112 detects user input "Anybody else have a camera that won't focus after upgrading to SuperCameraApp version 2.1?" Responsive to detecting the user input creating content to post to social media system 160, computing device 110A may output, to social media system 160, an indication of (e.g., data representing) the content to be posted by social media system 160.

In some examples, action management modules 122 associates social media reactions for the content with an action to be performed by an application module 117 of remote computing device 116. For example, action management modules 122 may associate social media reactions to the content for the post with an action to be performed by bug tracking application 117A of remote computing device 116. Action management modules 122 may associate the content for the post with the social media reactions based at least in part on the content for the post.

Action management modules 122 may analyze the content generated by computing device 110A for the post to associate the content with one or more actions to be performed by bug tracking application 117A. Action management modules 122 may only analyze data associated with computing devices 110 and/or users of computing devices 110 if the users affirmatively consent to use or collection of such data. Action management modules 122 may further provide opportunities for individual users to withdraw consent and in which case, action management modules 122 may cease analyzing, collecting, or otherwise retaining the data associated with the individual user or computing devices associated with the individual user. In some examples, action management modules 122 analyze the content by identifying one or more keywords included in the content. For example, action management modules 122 may include a pre-defined set of keywords and may parse the content of the post to determine whether the content of the post includes any of those keywords. As another example, action management modules 122 may utilize machine learning (e.g., natural language processing techniques) to analyze the content of the post.

In some examples, action management modules 122 determine whether the content for the post corresponds with one or more actions to be performed by bug tracking application 117A in response to analyzing the content for the post. For example, action management modules 122 may query bug tracking application module 117A for data about bugs tracked within bug tracking application module 117A. For example, action management modules 122 may determine that the content for the post corresponds to version "2.1" of an application titled "SuperCameraApp" and to a software bug in focusing the camera.

In response to determining the content for the post, action management modules 122 may query bug tracking application module 117A to determine whether bug tracking application module 117A includes any actions for the application titled "SuperCameraApp." Bug tracking application module 117A may include an application programming interface (API) by which action management modules 122 may interface with bug tracking application module 117A. In some scenarios, bug tracking application module 117A does not enable action management modules 122 to add new applications or bugs to bug tracking application module 117A when the application or the particular bug is not currently tracked by bug tracking application module 117A. In such scenarios, bug tracking application module 117A may output an indication that bug tracking application module 117A is not currently tracking any bugs for the SuperCameraApp in response to receiving a query from action management modules 122. In some scenarios, bug tracking application module 117A enables action management modules 122 to add new bugs and/or applications to bug tracking application module 117A. In such examples, bug tracking application module 117A may output an indication that the bug and/or application is not currently tracked by bug tracking application module 117A in response to a query from action management modules 122.

In some examples, bug tracking application module 117A is already tracking a particular application or a particular bug for the particular application. In such examples, bug tracking application module 117A may enable action management modules 122 to update data managed by bug tracking application module 117A in response to receiving one or more social media reactions. For example, bug tracking application module 117A may enable action management modules 122 to add a new bug to bug tracking application module 117A, increase priority of an existing bug (e.g., a bug currently tracked by bug tracking application module 117A), decrease priority of a bug, etc. Examples of social media reactions include agreement of the content of a post (e.g., "I agree", a smile, a head nod indicating affirmation, or the like), disagreement of the content of the post (e.g., "I disagree", "No way", a frown, a head nod indicating disapproval, or the like). In some examples, social media reactions include degrees of approval or disapproval, such as "I love this", "I like this", "I dislike this" or "I loathe this." In some examples, user may express social media reactions via user comments (e.g., initial comment or edits to a comment) to a post, by selecting graphical elements (e.g., icons) that are associated with a post and represent respective social media reactions to the post, or by selecting graphical elements to share, repost, or report a post. A user input indicative of a social media reaction may be a direct input (e.g., via an input device, such as a keyboard or mouse) or an indirect input (e.g., facial expression or body language captured by a camera).

In some examples, action management modules 122 associate one or more social media reactions with one or more actions to be performed by bug tracking application module 117A. For example, social media system 160 may enable users of social media system 160 to express agreement with content published by social media system 160, for example, by selecting a graphical user interface element labeled "I agree" when viewing content published by social media system 160. In such examples, action management modules 122 may associate a social media reaction expressing agreement with content published by social media platform with an action to increase priority of a particular bug tracked by bug tracking application module 117A. As another example, action management modules 122 may associate a social media reaction expressing mild agreement (e.g., "I like this") with content of a post with an action to increase priority of a particular bug by a first amount and a social media reaction expressing strong agreement (e.g., "I love this") with content of post with an action to increase priority of the particular bug by a second amount that is greater than the first amount. As yet another example, action management modules 122 may associate a social media reaction expressing approval of content with an action to increase priority of a bug and a social media reaction expressing disapproval of content with an action to decrease priority of a bug or remove the bug from bug tracking application module 117A.

Action management modules 122 may associate social media reactions with one or more actions to be performed by bug tracking application module 117A in response to creating content of the post. For example, action management modules 1222 may determine that the content of the post corresponds to a particular bug tracked by bug tracking application module 117A after the user creates the content and prior to receiving user input to post the content to social media system 160. In such examples, action management modules 122 may output a notification (e.g., for display or audible output) to computing device 116 indicating that one or more social media reactions correspond to one or actions to be performed by bug tracking application module 117A and requesting the user of computing device 110A approve the association between the social media reactions and the actions to be performed by bug tracking application module 117A. In other words, action management modules 122 may output a notification prompting the user to associate the social media reactions and actions to be performed by the bug tracking application module 117A. Action management modules 122 may associate the social media reactions and actions to be performed by bug tracking application module 117A in response to receiving a user input In some examples, action management modules 122 associate social media reactions with one or more to be performed by bug tracking application module 117A in response to reactions to the content of the post. For example, action management modules 122 may associate social media reactions with the one or more actions in response to receiving a threshold number of social media reactions to the content of the post or in response to the content being consumed by users of social media system 160 a threshold amount. In some scenarios, receiving a threshold number of social media reactions or being consumed by a threshold amount may indicate that the content is popular enough to trigger one or more actions in another application. As another example, action management modules 122 may associate the social media reactions with one or more actions to be performed by application modules 117 in response to determining that a new feature has been added to application modules 117. For example, action management modules 122 may associate the social media reactions with one or more actions to be performed by bug tracking application module 117A in response to determining that a new bug associated with the content of the post has been added to bug tracking application module 117A.

Action management modules 122 may store an indication of the association between the social media reactions for a particular post and actions to be performed by the application module 117. For example, action management modules 122 may store data indicating the association in metadata for the post. In some examples, action management modules 122 may store an indication of the association between the social media reactions for a particular post and actions to be performed by the application module 117 in action linker data stores 124A-124B (collective, "action linker data stores 124"). Action linker data stores 124 may store data in any number of different types of records and data structures, including a file, a database, a tree, an array, a hash table, a linked list, a graph or other type of record or data structure. Action linker data stores 124 may include one or more application profiles that are each associated with a respective application of application modules 117. For example, data stores 124 may include, for bug tracking application module 117A, data received from application module 117A, such as data identifying one or more bugs associated with bug tracking application module 117A, one or more actions to be performed by bug tracking application 117A, data identifying a particular post, one or more pre-defined social media reactions to the particular post, and one or more actions associated with each pre-defined social media reaction.

Social media module 126 of social media system 160 may output to a requesting device from devices 110, 116, an indication a post created by a user of computing device 110A that has been published to the social media platform of social media system 160. For example, computing device 110B may request, from social media system 160, content created by the user of computing device 110A. In response, social media module 126 may output, to computing device 110B and for display by computing device 110B, an indication of a graphical user interface 114B that includes content corresponding to one or more posts created by the user of computing device 110A. In some examples, graphical user interface 114B includes a graphical element 132 (e.g., a text box, graphical icon, animated gif, etc.) indicative of a social media reaction. In the example of FIG. 1, graphical element 132 is indicative of an affirmative social media reaction indicating agreement with the content of the post and includes the text "I agree."

Action management modules 122 may determine or detect a social media reaction to content of a post. In some examples, action management modules 122 may receive data indicating a user selected graphical element 132 and may determine a social media reaction to the content of the post based on a type of social media reaction associated with graphical element 132. For example, action management modules 122 may determine that the social media reaction to the post is an affirmative reaction to the post in response to receiving data indicating the user selected graphical element 132.

Responsive to receiving an indication of a social media reaction to content of a post (e.g., content created by a user of computing device 110A, as illustrated by graphical user interface 114A), action management modules 122 may publish an indication of the social media reaction to social media module 126. For example, social media module 126 may store data indicating that a user of social media system 160 expressed affirmation of the content of the post created by the user of computing device 110. Further, social media module 126 may output, to computing devices 110, an indication of a graphical user interface indicating that at least one user of social media system 160 expressed a reaction to the content of the post. As one example, graphical user interface 114A may include a graphical element 134 indicating a quantity of users of social media system 160 that have expressed the social media reaction. For example, as illustrated in FIG. 1, graphical element 134 includes text "4 users agree."

Responsive to receiving an indication of a social media reaction to content of the post, action management modules 122 may output, to a remote computing system that is executing the application (e.g., the bug tracking application module 117A), a command for the application to perform an action associated with the social media reaction. In some examples, action management modules 122 determine, based on data stored in action linker data stores 124, one or more actions performed by bug tracking application 117A that are associated with the social media reaction. For example, action management modules 122 may query action linker data stores 124 for actions associated with a social media reaction indicating affirmation of content of a particular post and in response, receive data indicating that a social media reaction indicating affirmation of the particular post is associated with an action to increase priority of the bug corresponding to the particular post. Responsive to determining one or more actions associated with the social media reaction, action management modules 122 may output a command to the application of the remote computing device to perform the one or more actions. For example, action management modules 122 may output a command to bug tracking application module 117A to increase priority of the bug (e.g., a camera focus bug) corresponding to the particular post created the user of computing device 110A.

While described in the context of linking social media reactions to a bug tracking application, techniques of this disclosure may enable a computing system to link social media reactions to actions performed by any other type of application executing at a remote computing device that is distinct from the social media system. In some examples, the application may be a payroll application, calendar application, etc. For example, action management modules 122 may link social media reactions to a calendar application. In such examples, a topic of a post may involve an upcoming event (e.g., a concert) and action management modules 122 may receive a user input for a social media reaction indicative approval of the post, such that action management modules 122 may automatically perform an action to add a calendar event for the concert to the user's calendar in response to receiving the user input indicating approval of the post.

In this way, action management modules 122 may dynamically link social media reactions published by a social media service of a social media platform with actions to be performed by remote applications that execute outside of and separate from the social media platform. Dynamically linking the social media reactions to actions performed by applications executing outside of the social media platform may reduce the number of user inputs required to execute an action, which may reduce processing performed by one or more computing devices. Reducing the number of user inputs required to execute a particular action may improve usability of the system and the user experience by reducing the number of applications a user must open and navigate, thus simplifying the process of performing one or more actions and making the process more desirable to the user. Further, by dynamically linking social media reactions to actions performed by other applications executing outside of the social media platform, and performing the actions in response to a social media reaction, the techniques of this disclosure may require fewer user inputs to perform one or more actions, which may decrease the power consumed by one or more computing devices. Further, by causing the remote application executing outside of the social media platform (e.g., a bug tracking application) to perform actions associated with social media reactions, the social media platform may provide additional feedback to the remote application from a large number of users of the social media platform who may not otherwise have access to the bug tracking application, which may increase the feedback to the bug tracking application and increase efficiency in identifying bugs in software.

A user may be provided with controls allowing the user to make an election as to both if and when computing devices, or computing systems described herein can collect or make use of personal data, and if and when the user is sent content or communications from a server. In addition, certain data may be treated in one or more ways before it is stored or used, so that personally identifiable data is removed. For example, a user's identity may be treated so that no personally identifiable data can be determined for the user, or a user's geographic location may be generalized where location data is obtained (such as to a city, ZIP code, or state level), so that a particular location of a user cannot be determined. Thus, the user may have control over what data is collected about the user, how that data is used, and what data is provided to the user.

Figure 2:
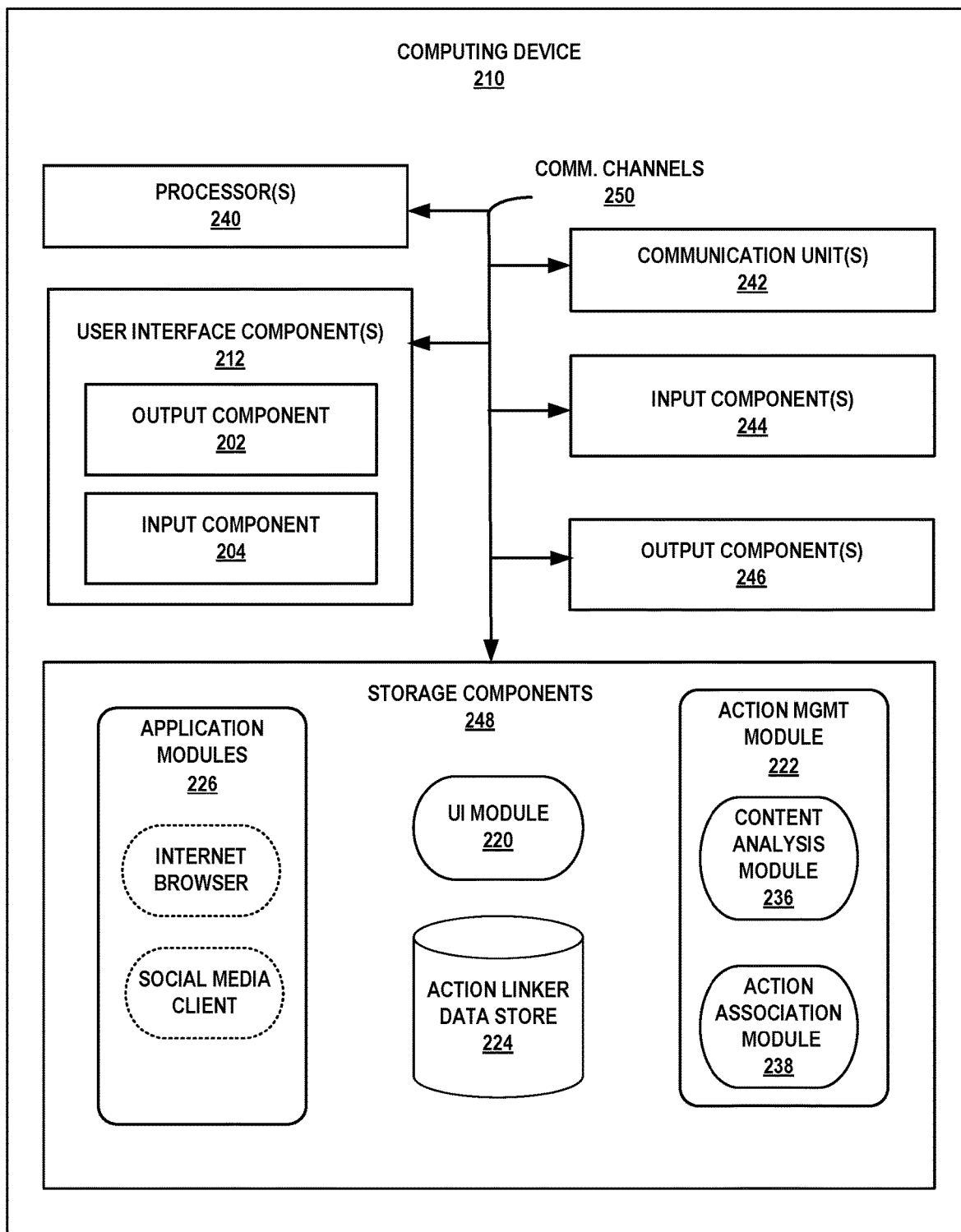
FIG. 2 is a block diagram illustrating an example computing device that dynamically links social media reactions to actions to be performed by an application that executes outside a social media platform, in accordance with one or more aspects of the present disclosure.

FIG. 2 is a block diagram illustrating an example computing device that dynamically links social media reactions to actions to be performed by an application that executes outside a social media platform, in accordance with one or more aspects of the present disclosure. Computing device 210 of FIG. 2 is described below as an example of computing devices 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 include UI module 220, action management module 222, one or more application modules 226, and action linker data store 224.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a global positioning satellite (GPS) receiver, or any other type of device that can send and/or receive data. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 244 may include one or more sensor components, such as one or more location sensors (e.g., GPS components), one or more temperature sensors, one or more movement sensors (e.g., accelerometers, gyros), one or more pressure sensors, and one or more other sensors (e.g., an audio sensor such as a microphone, an optical image sensor, infrared proximity sensor, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which data is displayed by UIC 212 and input component 204 may be a presence-sensitive input component that detects an object at and/or near output component 202. Output component 202 and input component 204 may be a speaker and microphone pair or any other combination of one or more input and output components, such as input components 244 and output components 246. In the example of FIG. 2, UIC 212 may output a user interface (such as user interfaces 114 of FIG. 1).

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store data for processing during operation of computing device 210 (e.g., computing device 210 may store data accessed by modules 220 and 222, and data store 224 during execution at computing device 210). In some examples, storage component 248 is a temporary memory, meaning that a primary purpose of storage component 248 is not long-term storage. Storage components 248 on computing device 210 may be configured for short-term storage of data as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of data than typically stored by volatile memory. Storage components 248 may further be configured for long-term storage of data as non-volatile memory space and retain data after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or data (e.g., data) associated with modules 220 and 222, and data store 224. Storage components 248 may include a memory configured to store data or other data associated with modules 220 and 222, and data store 224.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of computing device 210. For example, processors 240 of computing device 210 may retrieve and execute instructions stored by storage components 248 that cause processors 240 to perform the operations of modules 220 and 222. The instructions, when executed by processors 240, may cause computing device 210 to store data within storage components 248, for example, at data stores 224.

UI module 220 may include some or all functionality of UI module 120 of FIG. 1 and may perform similar operations as UI module 120 for executing an assistant as part of computing device 210. UI module 220 may manage user interactions with UIC 212 and other components of computing device 210. UI module 220 may cause UIC 212 to output a user interface as a user of computing device 210 views output and/or provides input at UIC 212.

Application modules 226 represent any application executing at computing device 210. Examples of application modules 226 include: internet browsers, social media clients, map or navigation software, media players, messenger clients, calendars, email clients, games, electronic assistants, developer tools, utility software, or any other type of software executable that may run on a computing device.

Application modules 226 may output (e.g., for display or audible output) data stored by a social media system, such as social media system 160 of FIG. 1. In some examples, application modules 226 include a social media client or an internet browser configured to receive data indicative of posts, comments, and/or social media reactions to posts from social media system 160 and output an indication posts and/or social media reactions. Application modules 226 may allow users of computing device 210 to create posts or react to posts created by users of other computing devices. For example, application modules 226 may output to UI module 220, an indication of a graphical user interface that allows a user of computing device 210 to create new content and UI module 220 may output, for display, a graphical user interface that allows the user to create new content (e.g., a graphical user interface that includes a graphical element, such as a text box to enter new text).

In some examples, UI module 220 detects a user input creating content to be posted to social media system 160 of FIG. 1. For example, input component 204 may be a touchscreen and UI module 220 may detect a user input (e.g., via a finger) interacting with a graphical user interface displayed by the touchscreen, where the user input creates content and may indicate a command to publish the content to social media system 160. As another example, input component 204 may include a microphone and UI module 220 may detect voice input indicative of content and a command to publish the content to social media system 160.

Responsive to detecting the user input creating the content of the post, application modules 226 may output an indication of the content to social media system 160 for publishing to social media module 126. For example, application modules 226 (e.g., a social media client executing at computing device 210) may output the content as video data, image data, and/or text data to social media system 160, such that social media system 160 may publish the content to social media module 126.

Action management module 222 may include some or all functionality of action management modules 122 of FIG. 1 and may perform similar operations as action management modules 222 for dynamically linking social media reactions and actions performed by application modules 117 of remote computing device 116 of FIG. 1. Action management module 222 may include various submodules, such as content analysis module 236, and action association module 238, which may perform the functionality of action management module 222.

Action management module 222 may interface with social media system 160 and application modules 117 of FIG. 1 to dynamically link social media reactions published by social media system 160 and actions to be performed by a particular application module 117 (also referred to as a remote application module 117) executing outside of social media system 160. In some examples, action management module 222 interfaces with social media system 160 and/or application module 117 via respective APIs that enable action management module 222 to register actions that should be linked to social media posts. In some examples, computing device 210 interfaces with social media platform and bug tracking application module 117A via an internet browser, for example, action management module 222 may be an internet browser extension or plugin configured to interact with one or more internet browser instances.

Action association module 238 may determine whether to associate social media reactions to a post with actions to be performed by an application executing at a computing device outside social media system 160. In some examples, action association module 238 may determine to associate social media reactions to a post with actions to be performed by bug tracking application module 117A in response to determining the number of social media reactions to the post satisfies a threshold number of reactions. For example, action association module 238 may associate a reaction to a post about a particular bug with an action to add the particular bug to bug tracking application module 117A in response to determining that the number of reactions to the post about the particular bug is greater than a threshold number of reactions. In such examples, association module 238 may improve the bug tracking system by automatically adding bugs to the bug tracking application module 117A after the particular bug has attracted the attention of a threshold number of users (e.g., one percent of users, two percent of users, 25 users, 50 users, etc.).

In some examples, action association module 238 associates one or more social media reactions to a post with actions to be performed by an application executing at a computing device outside social media system 160 in response to determining that a feature associated with the content of the post has been added to the application. For example, action association module 238 may associate a social media reaction to a post with an action to be performed by bug tracking application module 117A in response to determining that the content of the post corresponds to a particular bug and that the particular bug has been added to bug tracking application module 117A. As another example, action association module 238 may associate social media reactions to a post with an action to be performed by calendar application module 117B (e.g., an action to order lunch) in response to determining that the content of the post corresponds to a particular event (e.g., a work training) and that a food menu has been added to calendar application module 117B. Action association module 238 may rely on content analysis module 236 to determine whether posts or reactions to posts are associated with any actions.

Content analysis module 236 of action management module 222 may determine whether a post is associated with an action. For instance, content analysis module 236, in some examples, categorizes the content of the post into one or more topics or subjects. In other words, content analysis module 236 may determine one or more topics for the content of the post by analyzing the content of the post. Content analysis module 236 may only analyze data associated with computing device 210 and/or users of computing device 210 if the users affirmatively consent to use or collection of such data. Content analysis module 236 may further provide opportunities for individual users to withdraw consent and in which case, Content analysis module 236 may cease analyzing, collecting, or otherwise retaining the data associated with the individual user or computing devices associated with the individual user.

In some examples, content analysis module 236 determines one or more topics, or subjects, of the content by identifying one or more keywords included in the content. For example, content analysis module 236 may include a pre-defined set of keywords and may parse the content of the post to determine whether the content of the post includes or corresponds to any of the pre-defined keywords. Content analysis module 236 may determine that the content of the post corresponds to a keyword when the content includes a word associated with the keywords, such as a synonym or root word of the keyword.

As another example, content analysis module 236 may utilize machine learning to determine one or more topics of the post or comment. Example machine learning techniques that may be used can include various learning styles, such as supervised learning, unsupervised learning, and semi-supervised learning. Example types of algorithms of machine learning techniques include Bayesian algorithms, clustering algorithms, artificial neural network algorithms, deep learning algorithms, and the like. For example, content analysis module 236 may utilize one or more machine learning techniques to determine that the topics of the content include a particular application (e.g., an application titled "SuperCameraApp"), a version of the particular application (e.g., version 2.1), a feature of the particular application (e.g., a bug, such as an issue with the camera focus), among others.

Content analysis module 236 may determine one or more topics of the content based on user input. In some examples, content analysis module 236 may output (e.g., for display via output component 202, a group of candidate topics. For example, content analysis module 236 may output, via UI module 220 and for display by output component 202, an indication of a graphical user interface that includes a search bar allowing a user of computing device 210 to search through a list of pre-defined topics. Input component 204 may detect a user input selecting a topic and may output an indication of the user input (e.g., (x,y) coordinates). UI module 220 may receive indication of the user input, determine a topic that is displayed at a location of output component 202 corresponding to the user input, and output an indication of the selected topic to content analysis module 236.

Responsive to determining one or more topics of the content, content analysis module 236 may store an indication of the topics to action linker data store 224. In some examples, action linker data store 224 includes a social media profile associated with one or more posts published by social media system 160. For example, the social media profile may include metadata associated with one or more posts published by social media system 160, such as data identifying a social media account associated with the user of computing device 210, a timestamp for each post, indications of reactions to each respective post (e.g., a quantity of reactions, a quantity of each type of reactions, etc.), data indicating one or more topics of the post, etc.). In such examples, content analysis module 236 may update the social media profile associated with the post created by the user of computing device 210 to include data indicating the topics of the post created by the user of computing device 210. In some examples, content analysis module 236 may output, to social media system 160, an indication of the topics of the post such that social media system 160 may store data indicating the topics of the post.

Action association module 238 may determine whether an application module of the application modules 117 executing at remote computing device 116 of FIG. 1 includes actions corresponding to one or more topics of the content. In some examples, action association module 238 may determine application modules 117 include actions corresponding to the content of the post in response to determining the respective one of modules 117 include features corresponding to the content of the post. For example, action association management module 238 may determine whether a particular application module includes features corresponding to topics of the content based on an application profile stored within action linker data store 224.

In some examples, action linker data store 224 includes data indicative of actions that respective application modules 117 are configured to perform. For example, a particular application module of application modules 117 may register a group of actions that the particular application module is configured to perform. As another example, the particular application module 117 may register a group of actions that other computing devices (e.g., computing devices 110, 210, or social media system 160) are permitted to cause the particular application module to perform. Action association module 238 may receive, from remote computing device 116, data indicative of actions that respective application modules 117 are configured to perform and may store the data in an application profile associated with the respective application module within action linker data store 224.

As one example, an application profile corresponding to bug tracking application module 117A may include data indicating data identifying one or more actions bug tracking application 117A is configured to perform and that other computing devices (e.g., computing devices 110, 210, or social media system 160) are permitted to cause bug tracking application module 117A to perform. For example, the application profile corresponding to bug tracking application 117A may include data indicating that bug tracking application module 117A is configured to change (e.g., increase or decrease) priority of a bug being tracked by bug tracking application module 117A, update a description of the bug, add or remove the bug, associate the bug with various versions of the application, update the status of the bug (e.g., not yet reviewed, in progress, fixed, etc.), among others.

In some examples, the application profile corresponding to bug tracking application 117A includes data associated with one or more bugs associated with one or more application modules 226, data associated with posts published by social media system 160, data associated with one or more pre-defined social media reactions, among others. In some examples, the data identifying the one or more actions that bug tracking application module 117A is configured to perform includes data identifying actions associated with each pre-defined social media reaction.

In some examples, action linker data store 224 may include an action profile corresponding to a calendar application module 117B of application modules 117. The action profile corresponding to calendar application module 117B may include data indicating that calendar application module 117B is configured to order food for event attendees, respond to calendar invitations (e.g., create, accept, or decline a calendar invite), and so forth.

Action association module 238 may determine whether bug tracking application module 117A includes actions associated with one or more topics of the post based on the application profile corresponding to bug tracking application module 117A. For example, action association module 238 may determine that bug tracking application 117A includes actions associated with one or more topics of the post when the one or more topics correspond to a bug tracked by bug tracking application module 117A. For example, action association module 238 may query action linker data store 224 to determine whether data stored in the application profile for bug tracking application module 117A corresponds to the topic of the content of the post. In some scenarios, action association module 238 determines that one topic of the post includes an application titled "SuperCameraApp" (e.g., which may be referred to as a target application) and that another topic of the post includes a bug related to the camera focus (e.g., which may be referred to as a target bug). In such scenarios, action association module 238 determines whether bug tracking application module 117A is configured to perform one or more actions associated with the target application based on the application profile corresponding to bug tracking application module 117A. For example, action association module 238 may query action linker data store 224 to determine whether bug tracking application 117A is tracking any bugs for the target application or is tracking the target bug for the target application.

In some scenarios, action association module 238 queries an application module of application modules 117 to determine whether bug tracking application module 117A includes actions associated with the content. For example, bug tracking application module 117A may include a plugin or API configured to exchange data with other computing devices (e.g., computing devices 110, 210, or system 160). Action association module 238 may request, via the API provided by bug tracking application module 117A, data associated with the content of the post. In some examples, action association module 238 sends an indication of a topic of the post (e.g., data identifying a target bug) to bug tracking application module 117A and requests data associated with the topic of the post. For example, action association module 238 may send data indicating the target application is titled "SuperCameraApp," and, in response, may receive data identifying one or more bugs that are tracked by bug tracking application module 117A and are associated with the target application.

In some examples, the application profile corresponding to bug tracking application module 117A may indicate a group of one or more actions that bug tracking application module 117A is configured to perform for each bug tracked by bug tracking application module 117A. In this way, action association module 238 may determine that bug tracking application module 117A is configured to perform one or more of the actions associated with the content of the post in response to determining that bug tracking application module 117A is tracking the target bug, target application, target version of the application, or the like. In other words, if bug tracking application module 117A is tracking a target bug described in the content of a particular post, action association module 238 may determine that the content of the particular post is associated with the group of actions that bug tracking application module 117A is configured to perform.

As another example, action association module 238 may determine that certain users are permitted to cause a particular application module 117 to perform any action in the group of actions and that other users are permitted to cause the particular application to perform a subset of the actions. For example, action association module 238 may determine, based on an application profile corresponding to calendar application module 117B, that a first set of users is permitted to update a calendar client application or order food for event attendees and that a second set of users is permitted to update the calendar client application and is not permitted to submit food orders.

Responsive to determining one or more actions that an application executing outside of social media system 160 is configured to perform correspond to the content of the post, action association module 238 associates at least one of the actions with one or more social media reactions to the content of the post. As one example, in response to determining that a topic of the content includes a target application titled "SuperCameraApp" and that bug tracking application is configured to perform an action corresponding to the target application (e.g., because bug tracking application module 117A is already tracking bugs in the target app), action association module 238 may associate social media reactions to actions to be performed by bug tracking application module 117A. For example, action association module 238 may associate a social media reaction indicative of affirmation of the content of the post (e.g., an icon with the text "I agree!") with an action to increase priority of a software bug that is described by the post and is monitored by bug tracking application module 117A. In another example, action association module 238 may associate a social media reaction indicative of disapproval of the content of the post (e.g., an icon with the text "No way") with an action to decrease priority of the software bug that is described by the post and that is monitored by bug tracking application module 117A in response to determining that the topic of the content includes a particular version of the application tracked by bug tracking application. As another example, the content of a post may be associated with calendar application module 117B and action association module 238 may associate a reaction indicating a negative response to a post with an action to remove an event from the user's calendar that maintained by calendar application module 117B.

In some examples, action association module 238 associates a particular social media reaction with the same action to be performed by an application module 117 for all posts published by social media system 160. For example, when associating social media reactions to actions to be performed by bug tracking application module 117A, action association module 238 may associate a reaction indicating agreement with the content of a post to an action to increase priority of the corresponding bug for every bug tracked by bug tracking application 117A. In some scenarios, action association module 238 associates a particular social media reaction with one action for a first type of content and associates the particular social media reaction with a different action for a second type of content. For example, action association module 238 may associate a reaction expressing affirmation to content of a post with an action to increase priority of a bug and may associate the reaction expressing affirmation to the content of the post with an action to decrease priority of a different bug.

Action association module 238 may associate a social media reaction with an action to be performed by bug tracking application module 117A based on the type of social media reaction. In some scenarios, social media system 160 may be configured to publish a plurality of different types of reactions, such as reactions indicating affirmation of content of a post, reactions indication disapproval of content of a post, reactions indicating amusement from content of a post, reactions indicating surprise by content of a post, reactions indicating satisfaction or dissatisfaction with the content of a post (e.g., "This was helpful" or "This was not helpful"), or any other type of social media reaction. In some examples, social media reactions may include a first type of reactions indicating agreement with the content of a post and a second, different type of reactions indicating disagreement with the content of the post. In such examples, action association module 238 may associate actions to increase a priority of a particular bug with reactions indicating agreement with content of a post and associate actions to decrease priority of a particular bug with reactions indicating disagreement with the content of the post.

In some examples, action association module 238 associates reactions to content with actions performed by bug tracking application based on the type and intensity of the reaction. For example, action association module 238 may associate a reaction expressing relatively strong agreement (e.g., "I love this") with content of the post to an action to increase priority of a bug by a first amount and associate a reaction expressing relatively mild agreement (e.g., "I like this") to an action to increase priority of the bug by a second amount.

In some examples, action association module 238 associates social media reactions to content of a social media post with actions to be performed by bug tracking application 117A in response to a user creating the content of the post. For example, action association module 238 may associate the reactions to content of a particular social media post and actions to be performed by bug tracking application module 117A at approximately the same time a user of computing device 210 creates the content of the particular post. As used throughout this disclosure, at approximately the same time means within a threshold or predetermined amount of time, such as one second, thirty seconds, one minute, five minutes, etc. (e.g., as opposed to an exact instant in time). In such examples, action association module 238 may associate the content of the particular post with one or more actions after receiving user input indicative of the content but prior to outputting the content to the social media platform, or after outputting the content to the social media platform.

Responsive to associating one or more social media reactions to a post with one or more actions to be performed by an application executing at a computing device outside social media system 160, action association module 238 may store an indication of the association. For example, action association module 238 may store data indicating that a particular social media response to a particular post is associated with a particular action to be performed by application module 117A. For instance, action association module 238 may store data indication that a graphical icon labeled "I agree" for a particular social media post (e.g., about a bug in the application titled "SuperCameraApp") is associated with an action to increase priority of the bug within bug tracking application module 117A. In some examples, action association module 238 outputs data indicative of the association to social media system 160, which may enable social media system 160 to output a command to bug tracking application module 117A to perform the action in response to receiving a reaction (e.g., from another user of social media system 160) to the post.

Application modules 226 may output content of a post published by social media system 160 and allow users of application modules 226 to react to posts. For example, application modules 226 may output, via UI module 220 and for display, data indicative of a graphical user interface that includes a post published by social media system 160 and a graphical element (e.g., an icon, text box, etc.) indicative of a social media reaction to the post.

In some examples, UI module 220 determines or detects a social media reaction to a post. For example, input component 204 may be a touchscreen and UI module 220 may detect a user input (e.g., via a finger) interacting with a graphical element indicative of a social media reaction to the post. As one example, UI module 220 may detect a user input selecting an icon that is labeled "I agree" and that is associated with a particular social media reaction (e.g., an affirmative social media reaction). Action association module 238 may receive data indicating a selection of the icon labeled "I agree," and determine the icon is associated with a particular social media reaction (e.g., an affirmative social media reaction). As another example, UI module 220 may receive image data from a camera of computing device 110B (e.g., captured while computing device 110B displays graphical user interface 114B). Action association module 238 may receive the image data from UI module 220, determine a user's facial expression or emotion based on the image data, and determine the facial expression or emotion is associated with a particular a social media reaction.

Responsive to detecting the user input indicative of a social media reaction, action association module 238 may cause an application executing at a remote computing device that is outside the social media system 160 to perform one or more actions associated with the social media reaction. In some instances, action association module 238 queries action linker data store for data indicating one or more actions associated with the social media reaction. For instance, the content of a particular post may include the topic "SuperCameraApp" and action linker data store 224 may include data indicating that the graphical element corresponding to the social media reaction "I agree" for the particular post is associated with an action to increase a priority of a particular bug tracked by bug tracking application module 117A. In such examples, responsive to detecting user input selecting the social media reaction "I agree," action association module 238 may output an indication of the selection to social media system 160 for publishing the social media reaction and may output a command to bug tracking application module 117A causing bug tracking application module 117A to increase the priority of the particular bug. As another example, the content of a particular post may include a description of a calendar event (e.g., "Lunch meeting") and action linker data store 224 may include data indicating that the graphical element corresponding to the social media reaction "Sounds good!" for the particular post is associated with actions to RSVP to the calendar event and place a food order. In such examples, responsive to detecting user input selecting the social media reaction "Sounds good!", action association module 238 may output an indication of the selection to social media system 160 for publishing the social media reaction and action association module 238 may output a command to calendar application module 117B causing calendar application module 117B to RSVP to the calendar event and place the food order.

In some examples, action association module 238 may determine whether to cause an application executing at a remote computing device to perform one or more actions associated with the social media reaction. For example, action association module 238 may determine whether the user input is associated with a spam user (e.g., based on analysis of previous input from that user), and may refrain from outputting a command to the application executing at the remote computing device in response to determining that the user input is associated with a spam user.

FIGS. 3A-3E is illustrate graphical user interfaces of an example social media system that dynamically links social media reactions to actions to be performed by an application that executes outside a social media platform, in accordance with one or more aspects of the present disclosure. FIGS. 3A-3E are described below in the context of system 100 of FIG. 1.

Figure 3A:
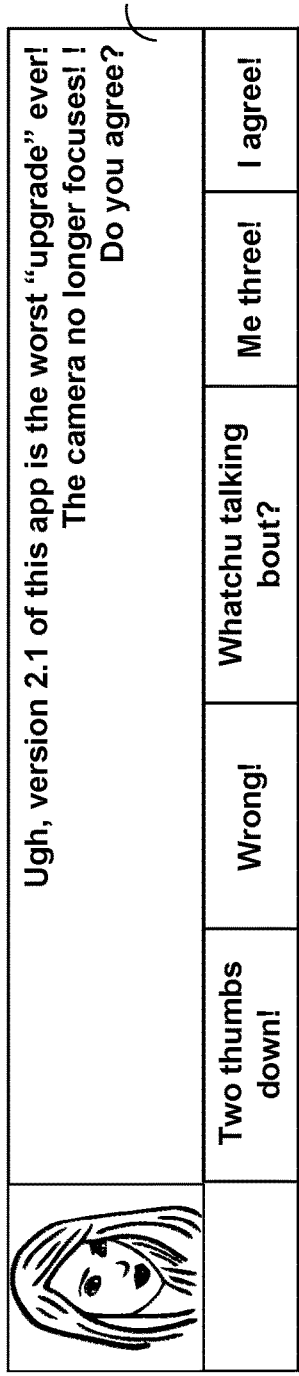
FIGS. 3A-3E is illustrate graphical user interfaces of an example system that dynamically links social media reactions to actions to be performed by an application that executes outside a social media platform, in accordance with one or more aspects of the present disclosure.

Computing device 110A may be configured to allow a user of computing device 110A to create content and submit the content to social media system 160. In some examples, computing device 110A includes an audio input device, such as a microphone, configured to receive audio input creating content for a social media post and a command to publish the content to social media system 160. As another example, computing device 110A may output, via UIC 112, a graphical user interface 300 associated with social media system 160 that allows a user to create content and command the social media system 160 to publish the content. In the example of FIG. 3A, graphical user interface 300 includes graphical element 302 (e.g., a text box) associated with content for a new post and graphical elements 304A-304E (e.g., icons) indicating social media reactions.

As illustrated in FIG. 3A, computing device 110A may detect a user input creating content for a new post. For example, computing device 110A may detect user input (e.g., audible, tactile, etc.) creating content and computing device 110A may output a graphical indication of the content to be displayed within graphical element 302 of graphical user interface 300. Responsive to receiving the user input creating the content, computing device 110A may output data indicative of the content to social media system 160. Social media system 160 may receive the data indicative of the content of the new post and may publish the content.

In some examples, action management modules 122 may determine whether the content of the post corresponds to an action to be performed by an application executing at a computing device outside of social media system 160. For example, action management modules 122 may determine a topic of the content and may determine whether the topic corresponds to a feature of the application executing outside social media system 160. In some examples, action management modules 122 may determine the topics of the post include a target application titled "SuperCameraApp" and a target bug titled "Focus Bug."

Action management modules 122 may determine whether one or more of the topics of the post correspond to actions of the application based on the topic of the post and an application profile associated with the application. For example, action management modules 122 may determine whether the action profile for bug tracking application module 117A includes data indicating bug tracking application module 117A tracks the target bug. In some scenarios, action management modules 122 determine that the content of the post is corresponds to an action to be performed by the application executing at a computing device outside of social media system 160 in response to determining that bug tracking application module 117A tracks the target bug identified in the content of the post.

Figure 3B:
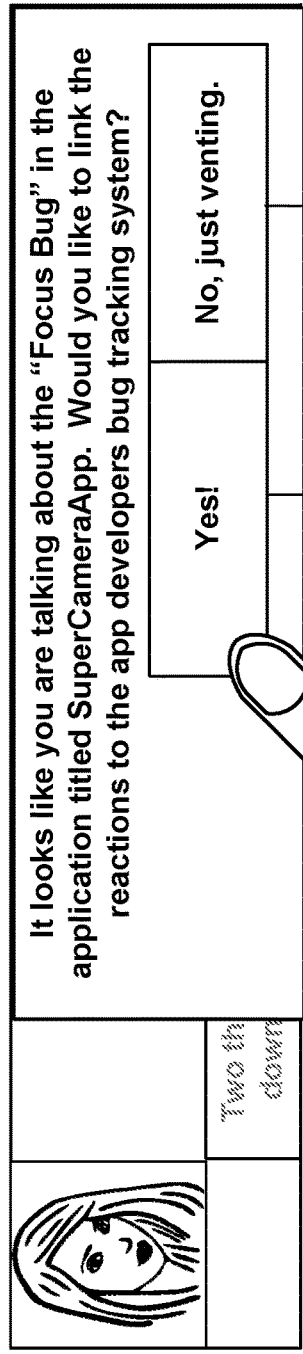

Responsive to determining that the content of the post corresponds to an action to be performed by the application executing at a computing device outside of social media system 160, action management modules 122 may determine whether to associate social media reactions to the post with actions to be performed by the application. In some examples, action management modules 122 may determine whether to associate the social media reactions to the post with actions to be formed by the application based on user input. For example, as illustrated in FIG. 3B, computing device 110A may output a graphical user interface 310 indicating that the content of the post corresponds to features of bug tracking application module 117A. In some examples, graphical user interface 310 includes graphical element 312 indicating a command to associate social media reactions to the post with actions to be performed by the application and graphical element 314 indicating a command to publish the post without association the social media reactions to actions to be performed by the application.

Figure 3C:
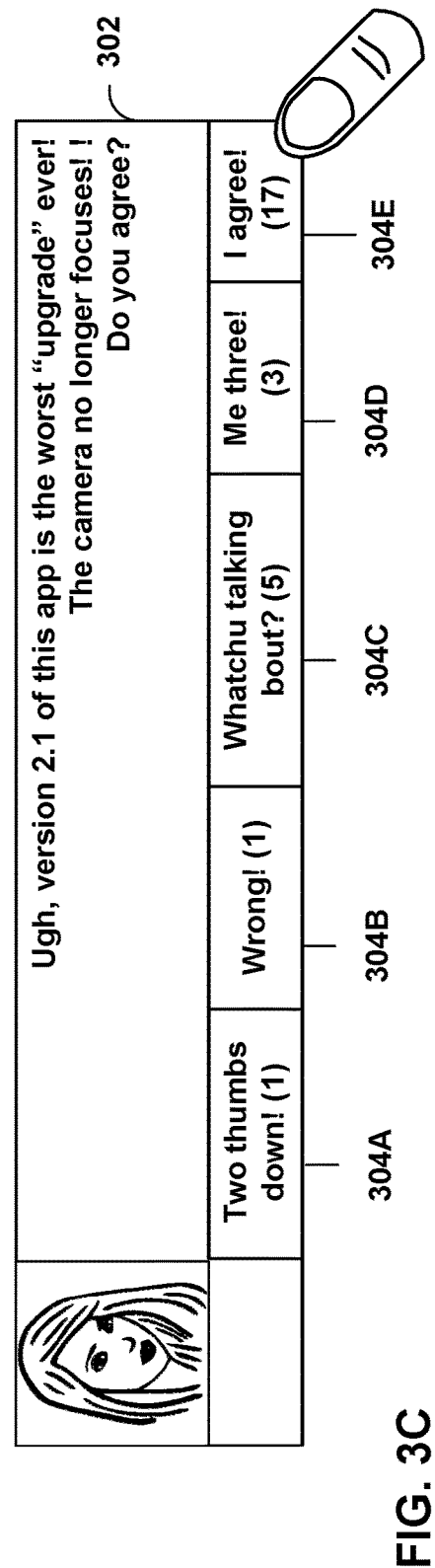

As illustrated in FIG. 3C, computing device 110B may detect a user input indicative of a social media reaction to the post created by a user of computing device 110A. For example, computing device 110B may output a graphical user interface 320 including a graphical element 302 for the content of the post and graphical elements 304A-304E representing respective social media reactions to the post.

Responsive to detecting a user input selecting graphical element 304E representing a social media reaction indicative of agreement with the content of the post (e.g., selecting a graphical icon labeled "I agree!"), action management modules 122 may determine whether the social media reaction is associated with one or actions to be performed by bug tracking application module 117A. In some examples, action management modules 122 may determine whether the social media reaction is associated with one or actions to be performed by bug tracking application module 117A based on an application profile for bug tracking application module 117A stored with action linker data stores 124.

Figure 3D:
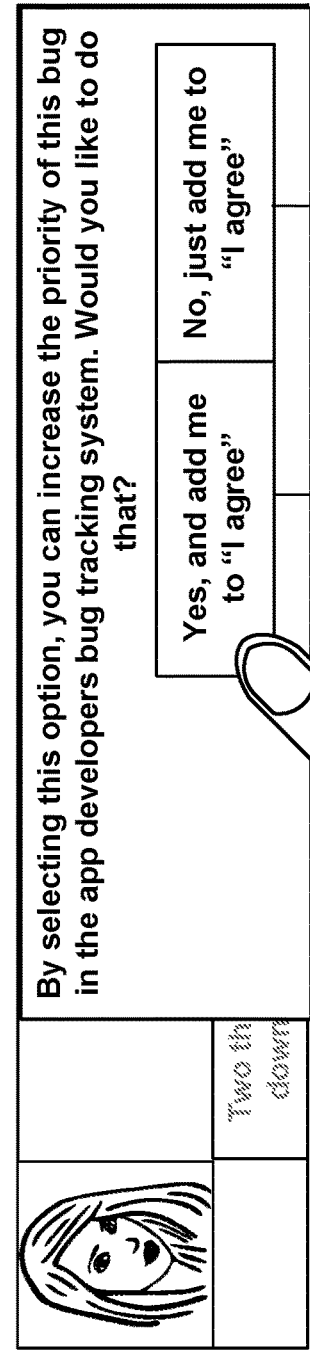
Figure 3E:
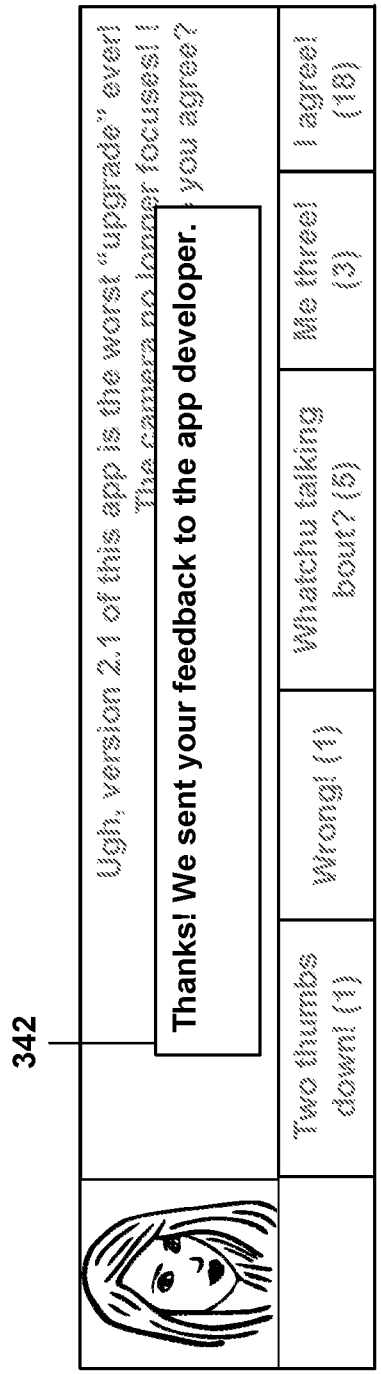

Responsive to determining that social media reaction corresponding to graphical element 304E is associated with one or actions to be performed by bug tracking application module 117A, computing device 110B may output graphical user interface 330. As illustrated in the example of FIG. 3D, graphical user interface 330 includes a graphical element 334 indicating a command to publish the social media reaction to social media module 126 without causing bug tracking application module 117A to perform an action. Responsive to detecting a user input selecting graphical element 332, action management modules 122 may output a command to social media system 160 to publish the reaction and may refrain from outputting a command to bug tracking application module 117A. Graphical user interface 330, in shown in the example of FIG. 3, also includes graphical element 332 indicating commands to publish the social media reaction and cause bug tracking application module 117A to perform the action associated with the selected social media reaction. Computing device 110B may detect a user input selecting graphical element 334 and may output a command to social media system 160 to publish the social media reaction and output the command associated with the selected social media reaction to bug tracking application module 117A. For example, as illustrated in FIG. 3E, computing device 110B may output graphical user interface 340 indicating that action management module 122 sent the command associated with the social media reaction to bug tracking application module 117A.

Figure 4:
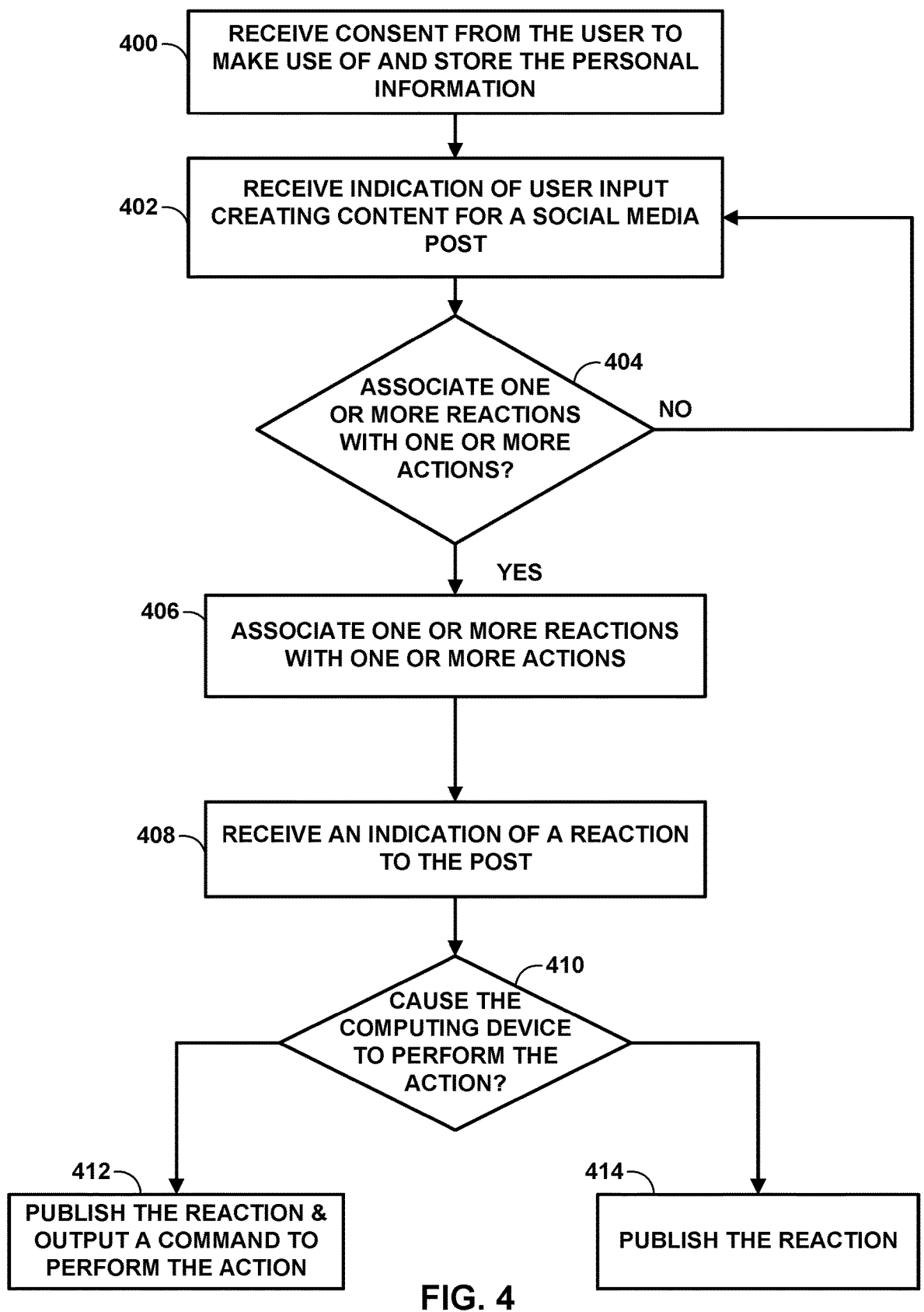
FIG. 4 is a flowchart illustrating example operations for dynamically linking social media reactions to actions to be performed by an application that executes outside a social media platform, in accordance with one or more aspects of the present disclosure.

FIG. 4 is a flowchart illustrating example operations for dynamically linking social media reactions to actions to be performed by an application that executes outside a social media platform, in accordance with one or more aspects of the present disclosure. FIG. 4 is described below in the context of action management modules 122 of FIG. 1. For example, action management modules 122, while executing at one or more processors of computing device 110A and/or social media system 160, may perform operations 400-414, in accordance with one or more aspects of the present disclosure.

In operation, computing device 110A receives consent from a user to make use of and store the personal information (400). For instance, in response to identifying potential personal information, action management modules 122 may cause UI module 120 to request permission from the user to store and make use of personal information obtained during interactions with action management modules 122 and the user. It should be understood that computing device 110A may not require a user to consent prior to each time that action management modules 122 wants to make use of or store personal information. For example, if computing devices 110A receives consent once a year, once a day, or even just one time (e.g., after initial product purchase, set up, etc.) computing device 110A may treat that prior consent as consent to make use and store personal information in the future.

Computing device 110A may detect user input creating content for a social media post (402) to be published by social media system 160. In some examples, computing device 110A may detect user input via a touchscreen, keyboard, microphone, or other input device. For example, computing device 110A may output, via a display device, a graphical user interface that includes a graphical element (e.g., text box) for creating new posts and may detect a user input at a display position of the display device corresponding to the graphical element for creating new posts.

In some examples, action management modules 122 may determine whether to associate social media reactions to the post with one or more actions to be performed by an application executing outside of social media system 160 (404). For example, action management modules 122 may determine whether to associate reactions to the post with actions to be performed by bug tracking application module 117A, calendar application 117B, payroll application, or any other application executing by a computing device outside of social media system 160.

As one example, action management modules 122 may determine whether to associate social media reactions to a post with actions to be performed by bug tracking application module 117A based on determining whether the number of social media reactions to the post satisfies a threshold number of reactions. For example, action management modules 122 may associate a reaction to a post about a particular bug with an action to add the particular bug to bug tracking application module 117A in response to determining that the number of reactions to the post about the particular bug is greater than a threshold number of reactions. In such examples, action management module 122A may improve the bug tracking system by automatically adding bugs to the bug tracking application module 117A after the particular bug has attracted the attention of a threshold number of users. As another example, action management modules 122 may associate a reaction to a post about a particular event, such as a concert, with an action to add a calendar event for the concert to a calendar application associated with the user.

In some scenarios, action management modules 122 determines whether to associate social media reactions to a post with actions to be performed based on the quantity of reactions for a particular type of social media reaction. For example, action management modules 122 may associate a first reaction to a first action (e.g., without associating a second type of reaction to a second action) in response to determining the quantity of the first type of reactions satisfies a threshold quantity of reactions. Likewise, action management modules 122 may associate a second reaction to a second action (e.g., without associating a first type of reaction to a first action) in response to determining the quantity of the second type of reactions satisfies a threshold quantity of reactions. In this way, action management modules 122 may associate reactions and actions individually without necessarily associate every type of social media reaction of social media system 160 with one or more actions to be performed by the remote application.

As another example, action management modules 122 determines whether to associate social media reactions to a post with actions to be performed based on a difference between the quantity of a first type of social media reactions (e.g., indicating approval of a post) and the quantity of a second type of social media reactions (e.g., indicating disapproval of a post) satisfies a threshold. For example, action management module 122A may determine that social media system 160 has published a certain quantity of reactions of a first type for a particular post and a different quantity of reactions of a second type for the particular post, and the reactions to the particular post may reflect mixed opinion on the post. In such examples, action management modules 122 may determine a difference in the quantity of the first type of reaction relative to the quantity of the second type of reaction and determine whether the difference satisfies a threshold quantity of reactions. Action management modules 122 may determine to associate social media reactions to a post with actions to be performed in response to determining that the difference between the quantity of a first type of social media reactions and the quantity of a second type of social media reactions satisfies (e.g., is greater than) the threshold quantity of reactions.

In some examples, action management modules 122 associates one or more social media reactions to a post with actions to be performed by an application executing at a computing device outside social media system 160 in response to determining that a feature associated with the content of the post has been added to the application. For example, action management modules 122 may associate a social media reaction to a post with an action to be performed by bug tracking application module 117A in response to determining that the content of the post corresponds to a particular bug and that the particular bug has been added to bug tracking application module 117A. As another example, action management modules 122 may associate social media reactions to a post with an action to be performed by calendar application module 117B (e.g., an action to order lunch) in response to determining that the content of the post corresponds to a particular event (e.g., a work training) and that a food menu has been added to calendar application module 117B.

Responsive to determining not to associate one or more social media reactions with actions to be performed by an application executing at a computing device outside social media system 160 ("NO" branch of 404), action management modules 122 may continue to monitor for user inputs creating new content or reacting to social media content.

Responsive to determining to associate one or more social media reactions with actions to be performed by an application executing at a computing device outside social media system 160 ("YES" branch of 404), action management modules 122 may associate one or more social media reactions with actions to be performed by an application (406). For example, action management modules 122 may store an indication of the association in action linker data store 124A. As another example, action management modules 122 may output an indication of the association to social media system 160 and/or application modules 117 for storing the association, e.g., as part of metadata maintained by social media system 160 for storing supplemental information, other than actual content, about a post, or in some other way.

Action management modules 122 may receive an indication of a reaction to a social media post (408). For example, a UI module of computing device 110B may detect a user input selecting a graphical element (e.g., icon) corresponding to a particular social media reaction and may output an indication (e.g., data identifying a type of the reaction) of the social media reaction corresponding to the selected graphical element.

In some examples, action management modules 122 automatically command the application executing at a computing device outside social media system 160 to perform the action or actions associated with the reaction to the post in response to receiving an indication of a reaction to a social media post.

In some examples, action management modules 122 may determine whether to command the application executing at a computing device outside social media system 160 to perform the action or actions associated with the reaction to the post (410). Action management modules 122 may determine whether to command the application to perform the action associated with the reaction based on user input. For example, action management modules 122 may output an indication of a graphical user interface including a first graphical element indicative of a command to publish the social media reaction and perform the action and a second graphical element indicative of a command to publish the social media reaction and refrain from performing the action.

Action management modules 122 may command social media system 160 to publish the social media reaction and command the application executing at a computing device outside social media system 160 to perform one or more actions associated with the reaction in response to receiving an indication of user input selecting the first graphical element (412). Action management modules 122 may command social media system 160 to publish the social media reaction may refrain from commanding the application to perform the one or more actions associated with the reaction in response to receiving a user input selecting the second graphical element (414).

Figure 5:
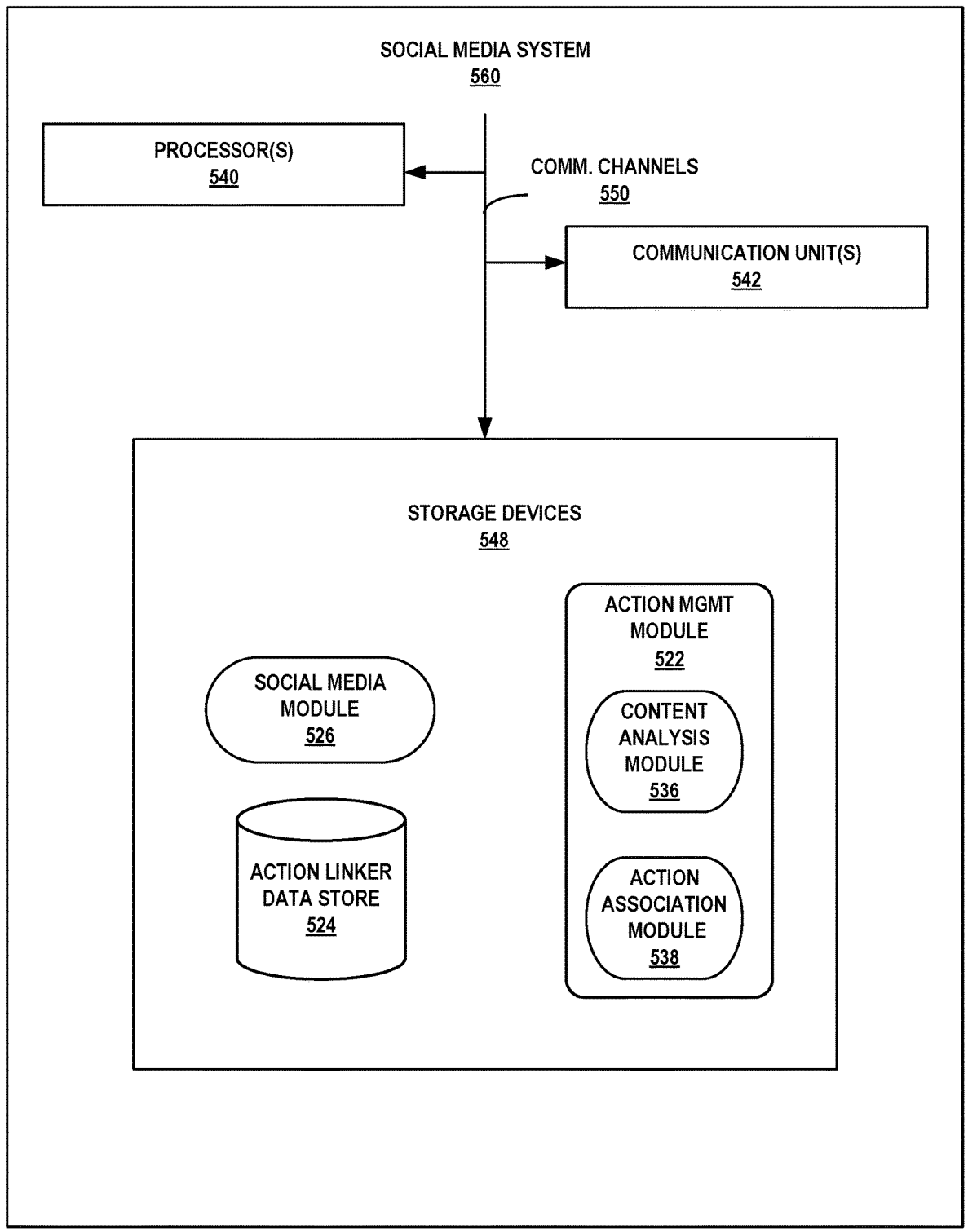
FIG. 5 is a block diagram illustrating an example computing device that dynamically links social media reactions to actions to be performed by an application executing outside a social media platform, in accordance with one or more aspects of the present disclosure.

FIG. 5 is a block diagram illustrating an example computing device that dynamically links social media reactions to actions to be performed by an application executing outside a social media platform, in accordance with one or more aspects of the present disclosure.

Social media system 560 of FIG. 5 is described below as an example of social media system 160 of FIG. 1. FIG. 5 illustrates only one particular example of social media system 560, and many other examples of social media system 560 may be used in other instances and may include a subset of the components included in example social media system 560 or may include additional components not shown in FIG. 5.

As shown in the example of FIG. 5, social media system 560 includes one or more processors 540, one or more communication units 542, and one or more storage devices 548. Storage devices 548 include social media module 526, action linker data store 524, and action management module 522.

Processors 540 are analogous to processors 240 of computing system 210 of FIG. 2. Communication units 542 are analogous to communication units 242 of computing system 210 of FIG. 2. Storage devices 548 are analogous to storage devices 248 of computing system 210 of FIG. 2. Communication channels 550 are analogous to communication channels 250 of computing system 210 of FIG. 2 and may therefore interconnect each of the components 540, 542, and 548 for inter-component communications. In some examples, communication channels 550 may include a system bus, a network connection, an inter-process communication data structure, or any other method for communicating data.

Action linker data store 424 is analogous to action linker data store 224 of FIG. 2 and is configured to store information associated with social media posts and actions to be performed by applications executing outside the social media system 560. Social media module 526 is analogous to social media module 126 of FIG. 1.

Action management module 522 may include some or all functionality of action management modules 122 of FIG. 1 and action management module 222 of computing device 210 of FIG. 2. Action management module 522 may perform similar operations as action management modules 122 and 222 for dynamically linking social media reactions to actions to be performed by an application executing at a computing device outside of social media system 160. Action management module 522 may provide an API to which action management module 122A and/or application modules 117 of FIG. 1 interface.

In operation, content analysis module 536 of action management module 522 may receive an indication of content of a post created by a user of computing device 110A of FIG. 1. Responsive to receiving the indication of the content, content analysis module 536 may determine one or more topics of the content. Content analysis module 536 may only analyze data associated with computing devices 110 and/or users of computing device 210 if the users affirmatively consent to use or collection of such data. Content analysis module 536 may further provide opportunities for individual users to withdraw consent and in which case, content analysis module 536 may cease analyzing, collecting, or otherwise retaining the data associated with the individual user or computing devices associated with the individual user. Content analysis module 536 may determine one or more topics of the content in a manner similar to content analysis module 236, for example by identifying one or more pre-defined keywords, utilizing machine learning, receiving user input indicating the topics, or a combination therein.

Content analysis module 536 may determine whether to associate social media reactions to a post with one or more actions to be performed by an application executing outside of social media system 560. For example, content analysis module 536 may determine to associate social media reactions to the post with one or more actions in response to determining that a quantity of social media reactions (e.g., quantity of all reactions, quantity of a particular type of reactions, quantity of a difference between types of reactions, etc.). As another example, content analysis module 536 may determine to associate social media reactions with actions to be performed in response to receiving an indication that a new feature has been added to the application. For example, content analysis module 536 may associate social media reactions to actions to be performed by a remote application in response to receiving data indicating a new software bug has been added to bug tracking application module 117A. In some examples, content analysis module 536 may determine to associate social media reactions with actions to be performed in response to receiving an indication of user input commanding content analysis module 536 to associate the social media reactions and actions to be performed.

Responsive to determining to associate social media reactions to a post with one or more actions to be performed by an application executing outside of social media system 560, action association module 538 may associate social media reactions to a post with one or more actions to be performed by an application executing outside of social media system 560. For example, action association module 238 may determine whether bug tracking application 117A includes actions associated with one or more topics of the post based on the application profile corresponding to bug tracking application module 117A. In some examples, the application profile corresponding to bug tracking application module 117A may include data indicating bugs tracked by bug tracking application module 117A and actions bug tracking application module 117A is configured to perform for each bug. In some instances, bug tracking application module 117A is configured to perform a group of actions and may perform, for any bug tracked by bug tracking application module 117A, any action from the group of actions. Action association module 538 may query the application profile corresponding to bug tracking application module 117A and receive data indicating that bug tracking application module 117A is tracking a particular bug for the application titled "SuperCameraApp" and a group of actions that bug tracking application module 117A is configured to perform for that bug.

In some examples, after associating one or more social media reactions to a post with one or more to actions to be performed, action association module 538 may receive an indication of a social media reaction to the post. For example, social media system 160 may receive data indicative of a user input selecting a graphical element (e.g., an icon) corresponding to a social media reaction. Responsive to receiving the indication of the social media reaction, action association module 538 may automatically output, to the application executing at the computing device outside social media system 560, a command to perform the one or more actions associated with the social media reaction. In some examples, action association module 538 may output a message to a client computing device (e.g., computing device 110B) causing computing device 110B to output a graphical user interface that includes a first graphical element that allows a user to command social media system 560 to publish the social media reaction and output a command to perform the one or more actions, and includes a second graphical element that allows the user to command social media system 560 to publish the social media reaction and refrain from outputting the command to perform the action. In such examples, social media system 560 may receive data indicating a user input selected the graphical element indicative of a command to publish the social media reaction and output a command to perform the one or more actions, such that social media system 560 publishes the social media reaction and outputs a command, to the application module 117 executing outside social media system 560, to perform the one or more actions.

The following numbered examples may illustrate one or more aspects of the disclosure:

Example 1. A method comprising: associating, by a computing system configured to provide a social media service, based on content of a post to the social media service, social media reactions for the content of the post with an action to be performed by an application; determining, by the computing system, a social media reaction to the content of the post; responsive to determining the social media reaction: publishing, by the computing system, an indication of the social media reaction to the social media service; and outputting, by the computing system and to a remote system that is executing the application, a command for the application to perform the action associated with the social media reactions. This may have the technical effect and advantage that a user of a social media service can, when a social media reaction is determined, cause the computing system configured to provide a social media service to output a command to a remote system executing an application, without the user being aware or having explicit access to the remote system and/or the application.

Example 2. The method of example 1, wherein the application is a bug tracking application, wherein the content of the post is associated with a particular bug for another application; wherein determining a social media reaction to the content of the post comprises receiving an indication of user input selecting a graphical element indicating affirmation of the content of the post, wherein publishing the indication of the social media reaction includes outputting, for display, an indication of the affirmation of the content of the post, and wherein outputting the command includes outputting, to the software bug tracking application, a command to increase priority of the particular bug. This may have the effect and advantage that a bug-tracking system can receive commands in response to a social media reaction from users of a social media service without those users having direct access to the bug tracking application or requiring the users to interact with a user interface of the bug-tracking application.

Example 3. The method of any one of examples 1-2, wherein associating the social media reactions for the content of the post with the action to be performed by the application comprises: associating the social media reactions with the action in response to receiving a threshold number of social media reactions to the content. This may have the effect and advantage that a low number of social media reactions below the threshold does not necessarily cause a command be out output to the application.

Example 4. The method of any one of examples 1-3, wherein associating the social media reactions for the content of the post with the action to be performed by the application comprises: receiving, by the computing system, an indication that a feature has been added to the application; and associating the social media reactions with the action in response to receiving the indication that the feature has been added to the application. This may have the effect and advantage that social reactions to an added feature of an application can be collected through the social media service quickly and timely after adding the feature.

Example 5. The method of any one of examples 1-4, wherein associating the social media reactions for the content of the post with the action to be performed by the application comprises: determining, by the computing system, one or more topics of the content; determining, by the computing system, whether at least one topic of the one or more topics corresponds to one or more features of the application; and associating the social media reactions for the content of the post with the action to be performed by the application in response to determining that the at least one topic corresponds to the one or more features of the application. This may have the effect and advantage that the action to be performed by the application can be determined based on the content of a post so that social media reactions to posts with different content may automatically lead to different actions.

Example 6. The method of any one of examples 1-5, wherein associating the social media reactions for the content of the post with the action to be performed by the application comprises: associating the social media reactions with the action based on user input received during creation of the post. This may have the effect and advantage that a user creating the post can control the command to be performed by the application in response to a social media reaction on the post.

Example 7. The method of any one of examples 1-6, wherein determining the social media reaction to the content of the post comprises: receiving, by the computing system, an indication of user input selecting a graphical element indicating a reaction to the content of the post. This may have the effect and advantage that a social reaction to a post can be intuitively given by user through input on a graphical user interface element.

Example 8. The method of any one of examples 1-7, further comprising: storing, by the computing system, data identifying one or more actions the social media service is permitted to cause the application to perform, wherein associating the social media reaction with an action to be performed by the application comprises associating, by the computing system, each social media reaction of a plurality of social media reactions with a respective action of a plurality actions to be performed by the application, wherein the plurality of social media reactions include the social media reaction, and wherein the plurality of actions include the action to be performed by the application. This may have the effect and advantage that the possible commands and actions to be performed by the application in response to determining a social media reactions can be restricted to certain permitted actions.

Example 9. The method of any one of examples 1-8, further comprising: outputting, by the computing system, to a client computing device associated with a user, for display, an indication of a graphical user interface including: a first graphical element indicating a command to publish the social media reaction and perform the action associated with the social media reaction; and a second graphical element indication a command to publish the social media reaction without performing the action associated with the social media reaction, receiving, by the computing system, an indication of user input selecting the first graphical element; wherein the computing system is configured to output the command for the application to perform the action associated with the social media reaction in response to receiving the indication of the user input selecting the first graphical element. This may have the effect and advantage that a user providing a social media reaction on a post can control whether an action to be performed by the application should occur or not, thus enabling a user to control the consequences of her social reaction with respect to a possible application executing on a remote system.

Example 10. A computing system comprising: at least one processor; memory comprising instructions that, when executed by the at least one processor, cause the at least one processor to: associate, based on content of a post to the social media service, social media reactions for the content of the post with an action to be performed by an application; determine, a social media reaction to the content of the post; responsive to determining the social media reaction: publish, an indication of the social media reaction to the social media service; and output, to a remote system that is executing the application, a command for the application to perform the action associated with the social media reactions.

Example 11. The computing system of example 10, wherein the application is a bug tracking application, wherein the content of the post is associated with a particular bug for another application; wherein execution of the instructions causes the at least one processor to determine a social media reaction to the content of the post by at least causing the at least one processor to receive an indication of user input selecting a graphical element indicating affirmation of the content of the post, wherein execution of the instructions causes the at least one processor to publish the indication of the social media reaction by at least causing the at least one processor to output, for display, an indication of the affirmation of the content of the post, and wherein execution of the instructions causes the at least one processor to output the command by at least causing the at least one processor to output, to the software bug tracking application, a command to increase priority of the particular bug.

Example 12. The computing system of any one of examples 10-11, wherein execution of the instructions causes the at least one processor to associate the social media reactions for the content of the post with the action to be performed by the application by at least causing the at least one processor to: associate the social media reactions with the action in response to receiving a threshold number of social media reactions to the content.

Example 13. The computing system of any one of examples 10-12, wherein execution of the instructions causes the at least one processor to associate the social media reactions for the content of the post with the action to be performed by the application by at least causing the at least one processor to: receive an indication that a feature has been added to the application; and associate the social media reactions with the action in response to receiving the indication that the feature has been added to the application.

Example 14. The computing system of any one of examples 10-13, wherein execution of the instructions causes the at least one processor to associate the social media reactions for the content of the post with the action to be performed by the application by at least causing the at least one processor to: determine one or more topics of the content; determine whether at least one topic of the one or more topics corresponds to one or more features of the application; and associate the social media reactions for the content of the post with the action to be performed by the application in response to determining that the at least one topic corresponds to the one or more features of the application.

Example 15. The computing system of any one of examples 10-14, wherein execution of the instructions causes the at least one processor to associate the social media reactions for the content of the post with the action to be performed by the application by at least causing the at least one processor to associating the social media reactions with the action based on user input received during creation of the post.

Example 15. The computing system of any one of examples 10-14, wherein execution of the instructions further causing the at least one processor to determine the social media reaction to the content of the post by at least causing the at least one processor to: receive an indication of user input selecting a graphical element indicating a reaction to the content of the post.

Example 16. The computing system of any one of examples 10-15, wherein execution of the instructions further causing the at least one processor to store data identifying one or more actions the social media service is permitted to cause the application to perform, wherein execution of the instructions further causing the at least one processor to associate the social media reaction with an action to be performed by the application by at least causing the at least one processor to associate each social media reaction of a plurality of social media reactions with a respective action of a plurality actions to be performed by the application, wherein the plurality of social media reactions include the social media reaction, and wherein the plurality of actions include the action to be performed by the application.

Example 17. The computing system of any one of examples 10-16, wherein execution of the instructions further causing the at least one processor to: output, to a client computing device associated with a user, for display, an indication of a graphical user interface including: a first graphical element indicating a command to publish the social media reaction and perform the action associated with the social media reaction; and a second graphical element indication a command to publish the social media reaction without performing the action associated with the social media reaction, receive an indication of user input selecting the first graphical element; wherein execution of the instructions further causing the at least one processor to output the command for the application to perform the action associated with the social media reaction in response to receiving the indication of the user input selecting the first graphical element.

Example 18. The computing system of any one of examples 10-17, wherein execution of the instructions further causing the at least one processor to associate the social media reactions for the content of the post with the action to be performed by the application by at least causing the at least one processor to: receive, information identifying one or more actions the social media is permitted to cause the application to perform; determine content of the post; determine whether the content of the post corresponds to at least one action of the one or more actions; and associate the social media reactions for the content of the post with the action to be performed by the application in response to determining that the content of the post corresponds to at least one action of the one or more actions.

Example 19. A computer-readable storage medium comprising instructions that, when executed cause at least one processor of a computing system to: associate, based on content of a particular post to a social media service, social media reactions for the content of the post with an action to be performed by a bug tracking application, wherein the content of the post is associated with a particular bug for another application; receive, from a computing device, an indication of user input selecting a graphical element indicating a user affirmation or a user disapproval of the content of the post; responsive to receiving the indication of user input selecting the graphical element: outputting, to the computing device and for display, an indication of the affirmation of the content of the post; and output, to a remote system that is executing the bug tracking application, a command for the bug tracking application to change priority of the particular bug.

Example 20. The computer-readable storage medium of example 19, wherein execution of the instructions causes the at least one processor to associate the social media reactions for the content of the post with the action to be performed by at least causing the at least one processor to: determine one or more topics of the content; determine whether at least one topic of the one or more topics corresponds to a bug monitored by the bug tracking application; and responsive to determining that the at least one topic corresponds to the bug monitored by the bug tracking application, associate the social media reactions for the content of the post with the action to be performed by the application.

Example 21. The computer-readable storage medium of any one of examples 19-20, wherein execution of the instructions causes the at least one processor to associate the social media reactions with the action in response to receiving a threshold number of social media reactions to the content.

Example 22. The computer-readable storage medium of any one of examples 19-21, wherein execution of the instructions causes the at least one processor to associate the social media reactions for the content of the post with the action to be performed by the application in response to receiving an indication that a bug has been added to the application.

Example 23. A system comprising means for performing the method of any one of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

The invention claimed is:

1. A method comprising:
associating, by a computing system configured to provide a social media service, based on content of a post to the social media service, a social media reaction for the content of the post with an action to be performed by an application, wherein the content of the post is associated with a particular bug of a plurality of bugs for another application;
determining, by the computing system, the social media reaction to the content of the post, wherein determining a social media reaction to the content of the post comprises receiving an indication of user input selecting a graphical element indicating affirmation of the content of the post; and
responsive to determining the social media reaction:
publishing, by the computing system, an indication of the social media reaction to the social media service, wherein publishing the indication of the social media reaction includes outputting, for display, an indication of the affirmation of the content of the post; and
outputting, by the computing system and to a remote system that is executing the application, a command for the application to perform the action associated with the social media reaction, wherein outputting the command includes outputting, to the application, a command to increase priority of the particular bug with respect to the plurality of bugs based on a level of affirmation expressed by the social media reaction.

2. The method of claim 1, wherein associating the social media reaction for the content of the post with the action to be performed by the application comprises:
determining one or more topics of the content;
determining whether at least one topic of the one or more topics corresponds to a bug monitored by the application; and
responsive to determining that the at least one topic corresponds to the bug monitored by the application, associating the social media reactions for the content of the post with the action to be performed by the application.

3. The method of claim 1, wherein associating the social media reactions for the content of the post with the action to be performed by the application comprises associating the social media reaction with the action in response to receiving a threshold number of social media reactions to the content.

4. The method of claim 1, wherein associating the social media reactions for the content of the post with the action to be performed by the application also comprises:
- receiving, by the computing system, an indication that a feature has been added to the application; and
- associating the social media reactions with the action in response to receiving the indication that the feature has been added to the application.

5. The method of claim 1, wherein associating the social media reactions for the content of the post with the action to be performed by the application also comprises:
- determining, by the computing system, one or more topics of the content;
- determining, by the computing system, whether at least one topic of the one or more topics corresponds to one or more features of the application; and
- associating the social media reactions for the content of the post with the action to be performed by the application in response to determining that the at least one topic corresponds to the one or more features of the application.

6. The method of claim 1, wherein associating the social media reactions for the content of the post with the action to be performed by the application further comprises:
- associating the social media reactions with the action based on user input received during creation of the post.

7. The method of claim 1, wherein determining the social media reaction to the content of the post further comprises receiving, by the computing system, an indication of user input selecting a graphical element indicating a reaction to the content of the post.

8. The method of claim 1, further comprising:
- storing, by the computing system, data identifying one or more actions the social media service is permitted to cause the application to perform,
- wherein associating the social media reaction with an action to be performed by the application comprises associating, by the computing system, each social media reaction of a plurality of social media reactions with a respective action of a plurality actions to be performed by the application,
- wherein the plurality of social media reactions include the social media reaction, and
- wherein the plurality of actions include the action to be performed by the application.

9. The method of claim 1, further comprising:
- outputting, by the computing system, to a client computing device associated with a user, for display, an indication of a graphical user interface including:
  - a first graphical element indicating a command to publish the social media reaction and perform the action associated with the social media reaction; and
  - a second graphical element indication a command to publish the social media reaction without performing the action associated with the social media reaction,
- receiving, by the computing system, an indication of user input selecting the first graphical element,
- wherein outputting the command for the application to perform the action associated with the social media reaction is in response to receiving the indication of the user input selecting the first graphical element.

10. A non-transitory computer-readable storage medium comprising instructions that, when executed cause at least one processor of a computing system to:
- associate, based on content of a particular post to a social media service, social media reactions for the content of the post with an action to be performed by a bug tracking application, wherein the content of the post is associated with a particular bug of a plurality of bugs for another application;
- receive, from a computing device, an indication of user input selecting a graphical element indicating a user affirmation or a user disapproval of the content of the post; and
- responsive to receiving the indication of user input selecting the graphical element:
  - outputting, to the computing device and for display, an indication of the affirmation of the content of the post; and
  - output, to a remote system that is executing the bug tracking application, a command for the bug tracking application to change priority of the particular bug with respect to the plurality of bugs based on a level of affirmation expressed by the social media reaction.

11. The non-transitory computer-readable storage medium of claim 10, wherein execution of the instructions causes the at least one processor to associate the social media reactions for the content of the post with the action to be performed by at least causing the at least one processor to:
- determine one or more topics of the content;
- determine whether at least one topic of the one or more topics corresponds to a bug monitored by the bug tracking application; and
- responsive to determining that the at least one topic corresponds to the bug monitored by the bug tracking application, associate the social media reactions for the content of the post with the action to be performed by the application.

12. The non-transitory computer-readable storage medium of claim 10, wherein execution of the instructions causes the at least one processor to associate the social media reactions with the action in response to receiving a threshold number of social media reactions to the content.

13. The non-transitory computer-readable storage medium of claim 10, wherein execution of the instructions causes the at least one processor to associate the social media reactions for the content of the post with the action to be performed by the application in response to receiving an indication that a bug has been added to the application.

14. A computing system comprising:
- at least one processor; and
- memory comprising instructions that, when executed by the at least one processor, cause the at least one processor to:
  - associate, based on content of a post to a social media service, social media reactions for the content of the post with an action to be performed by an application, wherein the content of the post is associated with a particular bug of a plurality of bugs for another application;
  - determine a social media reaction of the social media reactions to the content of the post, wherein execution of the instructions causes the at least one processor to determine the social media reaction to the content of the post by at least causing the at least one processor to receive an indication of user input selecting a graphical element indicating affirmation of the content of the post; and responsive to determining the social media reaction:
publish, an indication of the social media reaction to the social media service, wherein execution of the instructions causes the at least one processor to publish the indication of the social media reaction by at least causing the at least one processor to output, for display, an indication of the affirmation of the content of the post; and output, to a remote system that is executing the application, a command for the application to perform the action associated with the social media reactions, wherein execution of the instructions causes the at least one processor to output the command by at least causing the at least one processor to output, to the application, a command to increase priority of the particular bug relative to the plurality of bugs based on a level of affirmation of the content of the post.

15. The computing system of claim 14, wherein execution of the instructions causes the at least one processor to associate the social media reaction for the content of the post with the action to be performed by the application by at least causing the at least one processor to:
determine one or more topics of the content;
determine whether at least one topic of the one or more topics corresponds to a bug monitored by the application; and
responsive to determining that the at least one topic corresponds to the bug monitored by the application, associate the social media reactions for the content of the post with the action to be performed by the application.

16. The computing system of claim 14, wherein execution of the instructions causes the at least one processor to associate the social media reactions for the content of the post with the action to be performed by the application by also at least causing the at least one processor to:
receive an indication that a feature has been added to the application; and
associate the social media reactions with the action in response to receiving the indication that the feature has been added to the application.

17. The computing system of claim 14, wherein execution of the instructions causes the at least one processor to associate the social media reactions for the content of the post with the action to be performed by the application by further at least causing the at least one processor to:
determine one or more topics of the content;
determine whether at least one topic of the one or more topics corresponds to one or more features of the application; and associate the social media reactions for the content of the post with the action to be performed by the application in response to determining that the at least one topic corresponds to the one or more features of the application.

18. The computing system of claim 14, wherein:
execution of the instructions further causing the at least one processor to store data identifying one or more actions the social media service is permitted to cause the application to perform;
execution of the instructions further causing the at least one processor to associate the social media reaction with an action to be performed by the application by at least causing the at least one processor to associate each social media reaction of a plurality of social media reactions with a respective action of a plurality actions to be performed by the application;
the plurality of social media reactions include the social media reaction; and
the plurality of actions include the action to be performed by the application.

19. The computing system of claim 14, wherein execution of the instructions further cause the at least one processor to:
output, to a client computing device associated with a user, for display, an indication of a graphical user interface including:
a first graphical element indicating a command to publish the social media reaction and perform the action associated with the social media reaction; and
a second graphical element indication a command to publish the social media reaction without performing the action associated with the social media reaction;
receive an indication of user input selecting the first graphical element; and
output the command for the application to perform the action associated with the social media reaction in response to receiving the indication of the user input selecting the first graphical element.

20. The computing system of claim 14, wherein execution of the instructions further causing the at least one processor to associate the social media reactions for the content of the post with the action to be performed by the application by at least causing the at least one processor to:
receive, information identifying one or more actions the social media is permitted to cause the application to perform;
determine content of the post; determine whether the content of the post corresponds to at least one action of the one or more actions; and
associate the social media reactions for the content of the post with the action to be performed by the application in response to determining that the content of the post corresponds to at least one action of the one or more actions.

* * * * *